United States Patent
Kihara

(10) Patent No.: US 12,399,441 B2
(45) Date of Patent: Aug. 26, 2025

(54) ELECTROPHOTOGRAPHIC PHOTOCONDUCTOR AND IMAGE-FORMING APPARATUS INCLUDING THE SAME

(71) Applicant: SHARP KABUSHIKI KAISHA, Sakai (JP)

(72) Inventor: Akiko Kihara, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 897 days.

(21) Appl. No.: 17/516,153

(22) Filed: Nov. 1, 2021

(65) Prior Publication Data
US 2022/0146951 A1    May 12, 2022

(30) Foreign Application Priority Data
Nov. 12, 2020   (JP) ................. 2020-188742

(51) Int. Cl.
     *G03G 5/147*      (2006.01)
     *G03G 5/047*      (2006.01)

(52) U.S. Cl.
     CPC ................. *G03G 5/047* (2013.01)

(58) Field of Classification Search
     CPC .......... G03G 5/14795; G03G 5/14704; G03G 5/0503; G03G 5/0507
     See application file for complete search history.

(56) References Cited

U.S. PATENT DOCUMENTS

| | | | |
|---|---|---|---|
| 2012/0100473 A1 | 4/2012 | Iwamoto et al. | |
| 2015/0261106 A1* | 9/2015 | Azuma | G03G 5/14704 430/58.65 |

FOREIGN PATENT DOCUMENTS

| | | |
|---|---|---|
| JP | 2001-066800 A | 3/2001 |
| JP | 2003-527147 A | 9/2003 |
| JP | 2012-108487 A | 6/2012 |
| JP | 2013-109298 A | 6/2013 |
| JP | 2016-090919 A | 5/2016 |
| JP | 2017-049519 A | 3/2017 |
| WO | 00/69484 A1 | 11/2000 |
| WO | WO 2018139555 * 8/2018 ............... G03G 5/06 |

OTHER PUBLICATIONS

Translation of WO 2018139555.*

* cited by examiner

*Primary Examiner* — Peter L Vajda
(74) *Attorney, Agent, or Firm* — ScienBiziP, P.C.

(57) ABSTRACT

Provided is an electrophotographic photoconductor including an outermost surface layer containing inorganic compound microparticles that have a number mean primary particle diameter of 10-40 nm and are dispersed uniformly into the outermost surface layer at a proportion of 7-18% by mass in the outermost surface layer, wherein in slicing the outermost surface layer in its stacking direction with a thickness of 70 nm, observing a strip-shaped sample piece thus obtained in scanning transmission electron microscopy, converting a cross-sectional image thus obtained to an 8-bit binary image, and observing any 50 regions from regions having a 5 μm×5 μm observation field of view in the binary image, the following formula is met: $0.5 \leq S_{Ave}/N \leq 2.0$, and wherein a maximum gap region has a size of 1.0 μm or less when represents a space with absence of the inorganic compound microparticles converted to an equivalent circle diameter.

9 Claims, 4 Drawing Sheets

ELECTROPHOTOGRAPHIC PHOTOCONDUCTOR AND IMAGE-FORMING APPARATUS INCLUDING THE SAME

BACKGROUND OF THE INVENTION

Field of the Invention

The present invention relates to an electrophotographic photoconductor and an image-forming apparatus including the same. More particularly, the present invention relates to an electrophotographic photoconductor that has excellent printing durability and high mechanical strength, and produces neither image defect associated with partial breakage of a cleaning blade nor unevenness in density of an image associated with uneven wear, and an image-forming apparatus including the same.

Description of the Background Art

Recently, an organic photoconductor (herein also referred to as "electrophotographic photoconductor", or simply "photoconductor") that employs an organic photoconductive material has been widely used for an electrophotographic photoconductors.

However, an organic photoconductor has a disadvantage of being easily worn off on the surface by slide of a cleaning blade or the like in the proximity of the photoconductor because of the properties of organic materials.

Meanwhile, an organic photoconductor has been exposed under a more stringent environment where it is more easily worn off on the surface, in association with increased use of contact charging systems with roller charging, or extended long life, miniaturization, and speed-up of electrophotographic apparatuses such as digital copiers and printers in recent years.

Upon this, as a way for overcoming the disadvantages described above, several efforts have been made for improving mechanical characteristics (wear resistance, printing durability) of a material surface of a photoconductor so far.

Specifically, it has been investigated that inorganic microparticles (also simply referred to as "inorganic particles") such as silica or alumina are added as a filler to an outermost surface layer of a photoconductor.

For example, Japanese Patent Application Laid-open Publication No. 2017-049519 discloses a stacked electrophotographic photoconductor including a photoconductive layer that includes a charge generation layer containing a charge generating agent (also referred to as "charge generating substance"), and a charge transport layer containing a charge transporting agent (also referred to as "charge transporting substance"), a binder resin, a phthalocyanine pigment, and silica particles; in which the charge transport layer is a single layer and placed as an outermost surface layer; in which the content of the silica particles is 0.5 mass parts or more to 15 mass parts or less to 100 mass parts of the binder resin; and in which the mean primary particle diameter of the silica particles is 50 nm or more to 150 nm or less.

Moreover, Japanese Patent Application Laid-open Publication No. 2001-066800 discloses an electrophotographic photoconductor that has at least a photoconductive layer on an electrically-conductive base, in which an outermost surface layer contains a modified polycarbonate copolymerized resin including a repeating unit represented by the specific general formula (1), a repeating unit represented by the specific formula (2), and a repeating unit of a siloxane structure, and contains silica microparticles with a volume mean particle diameter of 0.005 μm or more to less than 0.05 μm.

Furthermore, it has also been investigated to form a curative protective layer (also referred to as "surface protective layer") on a charge transport layer, and to add inorganic microparticles such as silica particles as a filler to such outermost surface layer.

For example, Japanese Patent Application Laid-open Publication No. 2012-108487 discloses an electrophotographic photoconductor that has a photoconductive layer and a curative protective layer serially disposed on an electrically-conductive base; in which the curative protective layer contains a cured material of tri- or more polyfunctional, radical polymerizable compound, and a filler having a portion exposed from the surface; in which the surface of the curative protective layer has a projection projecting along the surface of the filler; and in which given that the radius of the fillers contained in the curative protective layer is r and that the film thickness of the curative protective layer is T, T>2r is provided and the formula (a): 100×(the number of fillers at a depth of T/2 from a free surface of the curative protective layer/the total number of fillers in the curative protective layer)≥70% is valid.

Nevertheless, the previous technologies described above have difficulty in satisfying both of improved wear resistance and good cleanability of a photoconductor surface.

In other words, there have been problems of failing to obtain a long-term stable image property, such as that although an outermost surface layer of a photoconductor forms a sea-island structure consisting of a sea part of a binder resin and island parts of inorganic particles, agglomeration of the inorganic particles enlarges distances between the islands, and produces localization of the island parts to lead to extreme difference in wear between the sea part and the island parts, thus causing breakage (damage) of a cleaning blade; and further that the biased wear of the outermost surface layer produces uneven coloring in an image.

The present invention thus has an object to provide an electrophotographic photoconductor that has excellent printing durability and high mechanical strength, and produces neither image defect associated with partial breakage of a cleaning blade nor unevenness in density of an image associated with uneven wear, and an image-forming apparatus including the same.

SUMMARY OF THE INVENTION

The present inventors earnestly investigated to solve the problems describes above, consequently found that the problems can be solved by satisfying both of improved printing durability and cleanability of a photoconductor when an outermost surface layer of a photoconductor contains inorganic compound microparticles having a certain number mean primary particle diameter at a certain mass proportion in which the inorganic compound microparticles are in a certain state of dispersion, and finally completed the present invention.

The present invention thus provides an electrophotographic photoconductor including a photoconductive layer that has at least a charge generation layer and a charge transport layer serially stacked, on an electrically-conductive base, wherein an outermost surface layer of the electrophotographic photoconductor contains inorganic compound microparticles, wherein the inorganic compound microparticles have a number mean primary particle diameter of 10-40 nm, and are dispersed uniformly into the outermost surface layer at a proportion of 7-18% by mass in the outermost surface layer, wherein in slicing the outermost surface layer in its stacking direction with a thickness of 70 nm, observing a strip-shaped sample piece thus obtained under a scanning transmission electron microscope, converting a cross-sectional image thus obtained to an 8-bit binary image, and observing any 50 regions from regions having a 5 μm×5 μm observation field of view in the binary image thus obtained, a relationship represented by the following formula is met:

$$0.5 \leq S_{Ave}/N \leq 2.0$$

wherein $S_{Ave}$ is a mean value of the 50 regions for a proportion (%) of an occupied area of the inorganic compound microparticles to an area of the observation region S (25 μm$^2$), and N is the total solid content (g) in the outermost surface layer, and wherein a maximum gap region has a size of 1.0 μm or less when represents a space with absence of the inorganic compound microparticles converted to an equivalent circle diameter.

The present invention also provides an image-forming apparatus that at least includes the electrophotographic photoconductor described above, a charging section to charge the electrophotographic photoconductor, an exposing section to expose the electrophotographic photoconductor thus charged and form an electrostatic latent image, a developing section to develop the electrostatic latent image formed by the exposure and form a toner image, a transferring section to transfer on a recording medium the toner image formed by the development, a fixing section to fix on the recording medium the toner image thus transferred and form an image, a cleaning section to remove and recover toner remaining on the electrophotographic photoconductor, and a static eliminating section to eliminate surface charge remaining on the electrophotographic photoconductor.

The present invention can provide an electrophotographic photoconductor that has excellent printing durability and high mechanical strength, and produces neither image defect associated with partial breakage of a cleaning blade nor unevenness in density of an image associated with ununiform wear, and an image-forming apparatus including the same.

That is, as shown in FIG. 3A, the photoconductor according to an embodiment of the present invention is considered to have loose intermolecular forces formed by inorganic compound microparticles on an outermost surface layer, thus forming a loose agglomeration structure like a uniform mesh structure having inorganic compound microparticles interconnected (island parts: black parts relative to sea of a binder resin (white part)) on the whole of the outermost surface layer. This presumably enables providing a photoconductor that has less uneven mechanical strength on the outermost surface layer, equalization of load onto a blade, suppression of progress of abrasive wear, and greatly enhanced printing durability and improved partial breakage of a cleaning blade compared to conventional photoconductors.

By contrast, as shown in FIG. 3B, a conventional photoconductor includes island structures (island parts: black parts) of a silica filler (inorganic compound microparticles) formed in a sea part (white part) of a binder resin on a photoconductive layer (outermost surface layer), but has long distance between the islands, extreme localization of a silica filler in the island parts, and extreme difference of wearability between the sea part and the island parts, thereby presumably causing partial breakage of a cleaning blade.

Patent Literature 3 described above discloses a ratio of a projected area of a filler part included in a curative protective layer and a projected area with absence of the filler, but does not disclose existence probability of inorganic compound microparticles in an outermost surface layer as that of the present invention.

The photoconductor according to an embodiment of the present invention further exhibits the effects described above when it satisfies any one of the following conditions (1)-(7):
(1) inorganic compound microparticles have a mean size of 0.005 μm$^2$ or less in a 5 μm×5 μm observation field of view in the binary image;
(2) inorganic compound microparticles have a void ratio ε of 0.96-0.98, the void ratio being represented by the formula: ε=1−rB/rS, wherein rB is a bulk density of the inorganic compound microparticles (g/cm$^3$), and rS is a true density of the inorganic compound microparticles (g/cm$^3$);
(3) an outermost surface layer has a surface with a surface roughness Rz of 0.2-1.0 μm defined in JIS-B-0601 (1994);
(4) inorganic compound microparticles are silica microparticles;
(5) silica microparticles are surface-treated with dimethyldichlorosilane or hexamethyldisilazane;
(6) an outermost surface layer is a charge transport layer configuring a photoconductive layer, or a surface protective layer formed on a photoconductive layer; and
(7) an undercoating layer is included between an electrically-conductive base and a photoconductive layer.

Figure 1:
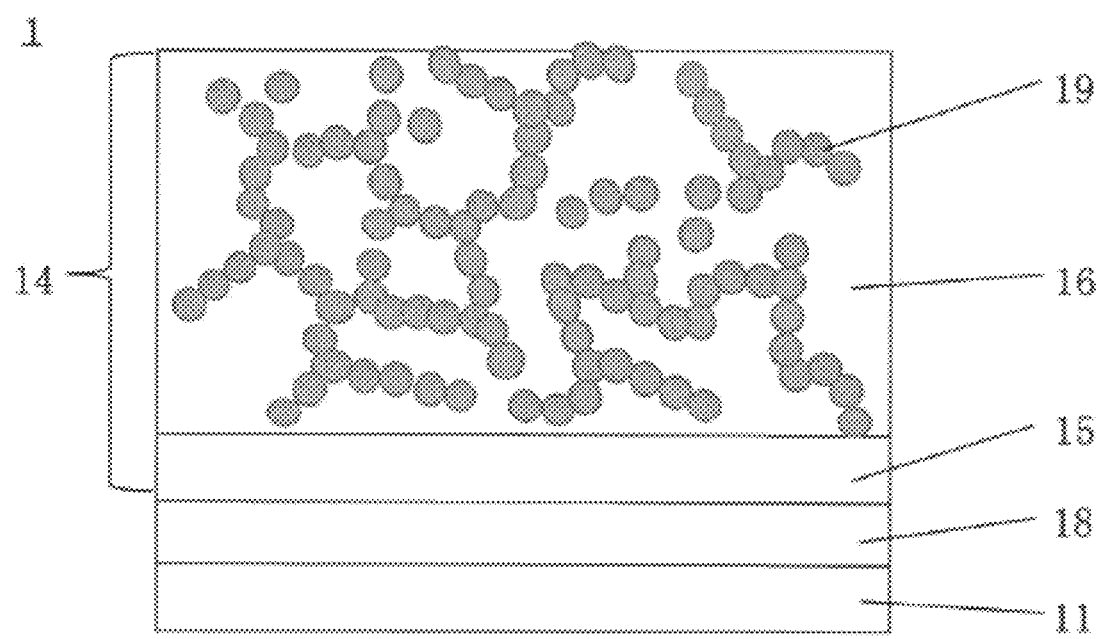
FIG. 1 is a schematic cross-sectional view illustrating a configuration of a main part of a photoconductor according to an embodiment of the present invention.

DESCRIPTION OF THE PREFERRED EMBODIMENTS (1) Electrophotographic Photoconductor

A photoconductor according to an embodiment of the present invention is an electrophotographic photoconductor including a photoconductive layer that has at least a charge generation layer and a charge transport layer serially stacked, on an electrically-conductive base, wherein an outermost surface layer of the electrophotographic photoconductor contains inorganic compound microparticles, wherein the inorganic compound microparticles have a number mean primary particle diameter of 10-40 nm, and are dispersed uniformly into the outermost surface layer at a proportion of 7-18% by mass in the outermost surface layer, wherein in slicing the outermost surface layer with a thickness of 70 nm in its stacking direction, observing a strip-shaped sample piece thus obtained under a scanning transmission electron microscope, converting a cross-sectional image thus obtained to an 8-bit binary image, and observing any 50 regions from regions having a 5 μm×5 μm observation field of view in the binary image thus obtained, a relationship represented by the following formula is met:

$$0.5 \leq S_{Ave}/N \leq 2.0$$

wherein $S_{Ave}$ is a mean value of the 50 regions for a proportion (%) of an occupied area of the inorganic compound microparticles to an area of the observation region S (25 μm$^2$), and N is the total solid content (g) in the outermost surface layer, and wherein a maximum gap region has a size of 1.0 μm or less when represents a space with absence of the inorganic compound microparticles converted to an equivalent circle diameter.

First of all, description will be made for the inorganic compound microparticles and its state of dispersion on the outermost surface layer, that is, 8-bit binary image analysis of a cross-sectional image in scanning transmission electron microscopy of the outermost surface layer containing the inorganic compound microparticles, and then description will be made for each configuration of the photoconductor.

Inorganic Compound Microparticles

The photoconductor according to an embodiment of the present invention contains inorganic compound microparticles as a filler on the outermost surface layer.

The inorganic compounds in the inorganic compound microparticles include silica (silicon dioxide: $SiO_2$), alumina ($Al_2O_3$), ceria ($CeO_2$), molybdenum oxide ($MoO_3$), titania ($TiO_2$), zirconia ($ZrO_2$), zinc oxide (ZnO), iron oxides including magnetite ($Fe_3O_4$) and various forms of $Fe_2O_3$, niobium oxide ($Nb_2O_5$), vanadium oxide (VO), tungsten oxide ($WO_2$), and tin oxide (SnO); one of these can be used alone, or two or more types can be used as a mixture or a mixture oxide. Here, the formulae in parentheses represent typical oxide forms, and different oxide forms are also considered depending on a valence of a metallic atom and included in the present invention.

Among the oxides described above, in view of wear resistance, silica, alumina, and titania are preferable, and silica and alumina are more preferable; and in view of electrical characteristics, silica is particularly preferable.

Silica microparticles preferably used in the present invention are not limited by a production method and an origin, as long as they have the number mean primary particle diameter described above.

The silica microparticles include dry silica particles such as fumed silica derived by burning silicon tetrachloride, or arc silica derived by forming silica into microparticles in a vapor phase with high energy such as plasma; wet silica particles such as precipitated silica derived by synthesis from an aqueous sodium silicate solution as a raw material in an alkaline condition, and gelled silica derived by synthesis in an acid condition; colloidal silica particles derived by alkalifying and polymerizing acidic silicate; and sol-gel silica particles derived by hydrolysis of an organic silane compound.

Number Mean Primary Particle Diameter of Inorganic Compound Microparticles

The inorganic compound microparticles, which represent a filler in the present invention, have a number mean primary particle diameter of 10-40 nm.

With a number mean primary particle diameter of the inorganic compound microparticles of less than 10 nm, sufficient printing durability may fail to be provided. On the other hand, with a number mean primary particle diameter of the inorganic compound microparticles of more than 40 nm, a larger agglomeration structure may generate in the photoconductive layer, thus being likely to cause problems such as poor cleaning.

The number mean primary particle diameter of the inorganic compound microparticle is preferably 10-20 nm.

A measurement method thereof will be described in Examples.

Content of Inorganic Compound Microparticles

The inorganic compound microparticles as a filler are contained at a proportion of 7-18% by mass and dispersed uniformly in the outermost surface layer.

With a content of the inorganic compound microparticle of less than 7% by mass, an effect on wear resistance may not be sufficiently provided. On the other hand, with a content of the inorganic compound microparticles of more than 18% by mass, dispersibility may not be sufficient and agglomeration may increase, thus providing deteriorated cleanability.

The content of the inorganic compound microparticles is preferably 7-12% by mass in the outermost surface layer.

Surface Treatment of Inorganic Compound Microparticles

For the purpose of improving an electrical property of the photoconductor, the inorganic compound microparticles in the present invention is preferably surface-treated with a surface finishing agent.

When the inorganic compound microparticles are silica particles, examples of the surface finishing agents therefor include hexamethyldisilazane, N-methyl-hexamethyldisilazane, N-ethyl-hexamethyldisilazane, hexamethyl-N-propyl-disilazane, dimethyldichlorosilane, and polydimethylsiloxane.

Among these surface finishing agents, dimethyldichlorosilane and hexamethyldisilazane are particularly preferable, because they have good reactivity with a hydroxyl group on a silica particle surface, reduces the number of hydroxyl groups on the silica particle surface, and consequently enables suppression of reduction in an electrical property of the photoconductor due to water (humidity).

The present invention can employ silica particles obtained by treatment with the surface finishing agent described above, but can also use commercially-available silica microparticles treated with a surface finishing agent. Examples of the commercially-available silica microparticles include products named R972, R974, RX50, RX200, NX130, NX90 G, NX90S, and NAX-50, manufactured by Nippon Aerosil Co., Ltd.; products named TS610, TG709F, and TG6110 G, manufactured by Cabot Japan K. K.; and a product named YA010C, manufactured Admatechs Co., Ltd.

State of Dispersion of Inorganic Compound Microparticles on Outermost Surface Layer In the present invention, the phrase "the inorganic compound microparticles are dispersed uniformly into the outermost surface layer" means that the inorganic compound microparticles are contained in the outermost surface layer so as to satisfy the following dispersion conditions.

A state of dispersion of the inorganic compound microparticles in the outermost surface layer is analyzed on the basis of an 8-bit binary image of a cross-sectional image in scanning transmission electron microscopy of the outermost surface layer.

In slicing the outermost surface layer in its stacking direction with a thickness of 70 nm, observing a strip-shaped sample piece thus obtained under a scanning transmission electron microscope, converting a cross-sectional image thus obtained to an 8-bit binary image, and observing any 50 regions from regions having a 5 μm×5 μm observation field of view in the binary image thus obtained, the photoconductor according to an embodiment of the present invention meets the following formula:

$$0.5 \leq S_{Ave}/N \leq 2.0$$

wherein $S_{Ave}$ is a mean value of the 50 regions for a proportion (%) of an occupied area of the inorganic compound microparticles to an area of the observation region S (25 μm²), and N is the total solid content (g) in the outermost surface layer, and wherein a maximum gap region has a size of 1.0 μm or less when represents a space with absence of the inorganic compound microparticles converted to an equivalent circle diameter.

An imaging analysis thereof will be described in Examples.

$S_{Ave}$ (%) means a mean ratio of the total occupied area of the inorganic compound microparticles $S_{sa}$ to the total area of an observation field of view of the photoconductive layer $S_{total}$.

With a $S_{Ave}/N$ of less than 0.5, a filler in the photoconductive layer may not be distributed insufficiently, and thus failing to provide sufficient printing durability. On the other hand, with a $S_{Ave}/N$ of more than 2.0, maldistributed agglomeration bodies with a large amount of a filler may be formed and thereby attach abundantly to a cleaning blade via repeated image formation, thus causing poor cleaning.

$S_{Ave}/N$ is preferably 1.0 or more to 1.8 or less.

With a maximum gap region of more than 1.0 μm, distribution of a filler in the photoconductive layer may be insufficient, thus causing poor cleaning. On the other hand, the lower limit of the maximum gap region is about 0.2 μm.

Mean Size of Inorganic Compound Microparticles

In a region of the 5 μm×5 μm observation field of view in the binary image described above, the inorganic compound microparticles preferably have a mean secondary size of 0.005 μm² or less.

With a mean secondary size of more than 0.005 μm², an agglomeration structure of a filler may be larger, thus being likely to cause poor cleaning. On the other hand, the lower limit of the mean secondary size is about 0.002 μm².

The mean secondary size is preferably 0.003 μm² or less.

The mean particle size can be adjusted by dispersion of an application liquid containing the inorganic compound microparticles, as described in Examples.

Void Ratio of Inorganic Microparticles, ε

The inorganic compound microparticles preferably have a void ratio ε of 0.96-0.98, represented by the following formula:

$$\varepsilon = 1 - rB/rS$$

wherein rB is a bulk density of the inorganic compound microparticles (g/cm³), and rS is a true density of the inorganic compound microparticles (g/cm³).

The bulk density rB is an apparent density of agglomeration of the inorganic compound microparticles, and can be calculated by, for example, adding a corresponding volume of the inorganic compound microparticles to a 250 mL-volume graduated cylinder, and dividing its weight (g) by a cubic volume (cm³) after standing for 2 minutes.

The true density rS is a physical property value inherent in an inorganic compound in the inorganic compound microparticles, and for example, silica has 2.2 g/cm.

With a void ratio ε of 0.96, printing durability may be less provided. On the other hand, with a void ratio ε of more than 0.98, a state of dispersion of a filler in the photoconductive layer may be insufficient, causing poor cleaning.

Surface Roughness of Outermost Surface Layer, Rz

The outermost surface layer of the photoconductor according to an embodiment of the present invention preferably has a surface with a surface roughness Rz of 0.2-1.0 μm defined in JIS-B-0601 (1994).

This is achieved by inorganic compound microparticles with a small particle diameter agglomerating appropriately and uniformly. In general, larger particle diameter of inorganic compound microparticles increases wear resistance, but causes a chip of an edge part of a cleaning blade. In the present invention, small inorganic compound microparticles are approximately agglomerated, thereby creating large particles to improve wear resistance, and for chipping of a cleaning blade, small particles are peeled off, thus allowing a partial breakage to be less likely to occur.

Surface roughness Rz is an indicator of a state of agglomeration caused by inorganic compound microparticles on the outermost surface layer of the photoconductor. Ten-point mean roughness Rz defined by JIS-B-0601 (1994) means a value represented by μm that indicates, in a part corresponding to a standard length extracted from a cross-sectional curve of the outermost surface layer of the photoconductor, a difference between a mean value of elevations of the first to the fifth highest mountaintops measured in a direction perpendicular to a mean line and a mean value of depths of the first to the fifth deepest valley bottoms, from a straight line parallel to the mean line and not intersecting the cross-sectional curve. A measurement method thereof will be described in Examples.

With a surface roughness Rz of less than 0.2 μm, agglomeration of the inorganic compound microparticles may not be sufficient, thus making it difficult to provide an effect on wear resistance. On the other hand, with a surface roughness Rz of more than 1.0 μm, agglomeration of the inorganic compound microparticles may be too large, thus being likely to cause a cleaning blade to chip a piece of an edge part, failing to provide sufficient cleaning of remaining toner, and producing a streaked defect in a printed image.

Surface roughness Rz is more preferably 0.2-0.5 μm.

Photoconductor

The photoconductor according to an embodiment of the present invention includes a photoconductive layer that has at least a charge generation layer and a charge transport layer serially stacked, on an electrically-conductive base.

The outermost surface layer is preferably a charge transport layer configuring the photoconductive layer, or a surface protective layer formed on the photoconductive layer.

With use of the drawings, description will now be made for the photoconductor according to an embodiment of the present invention, in which the outermost surface layer is a charge transport layer, but the present invention is not limited thereby.

In other words, when the outermost surface layer is a surface protective layer, the photoconductor exhibits an excellent effect of the present invention by the surface protective layer containing certain inorganic compound microparticles at a certain proportion as well as satisfying a condition for a certain state of dispersion.

FIG. 1 is a schematic cross-sectional view illustrating a configuration of a main part of a photoconductor according to an embodiment of the present invention.

A photoconductor 1 is a stacked photoconductor (also referred to as "separated-function photoconductor") that has an undercoating layer 18 disposed on an electrically-conductive base 11, and further thereon has a photoconductive layer with a stacked structure (also referred to as "stacked photoconductive layer", "separated-function photoconductive layer") 14 formed by stacking a charge generation layer 15 containing a charge generation substance (not depicted), and a charge transport layer 16 containing a charge transport substance (not depicted), a binder resin for binding the substance (not depicted), and inorganic compound microparticles 19, serially in this order.

Each configuration will be described below.

Electrically-Conductive Base 11

The electrically-conductive base has a function as an electrode of a photoconductor and a function as a support member, and a component material thereof is not particularly limited as long as it is a material used in the art.

In particular, examples include metallic materials such as aluminum, aluminum alloy, copper, zinc, stainless steel, and titanium; and macromolecule materials such as polyethylene terephthalate, nylon, and polystyrene, hard paper, and glass that have a surface treated with metallic foil lamination, metallic vapor deposition, or vapor deposition or application of a layer of an electrically-conductive compound such as electrically-conductive macromolecules, tin oxide, or indium oxide. Among them, in view of ease of processing, aluminum is preferable, and aluminum alloy such as JIS3003-based, JIS5000-based, and JIS6000-based alloy are particularly preferable.

Figure 2:
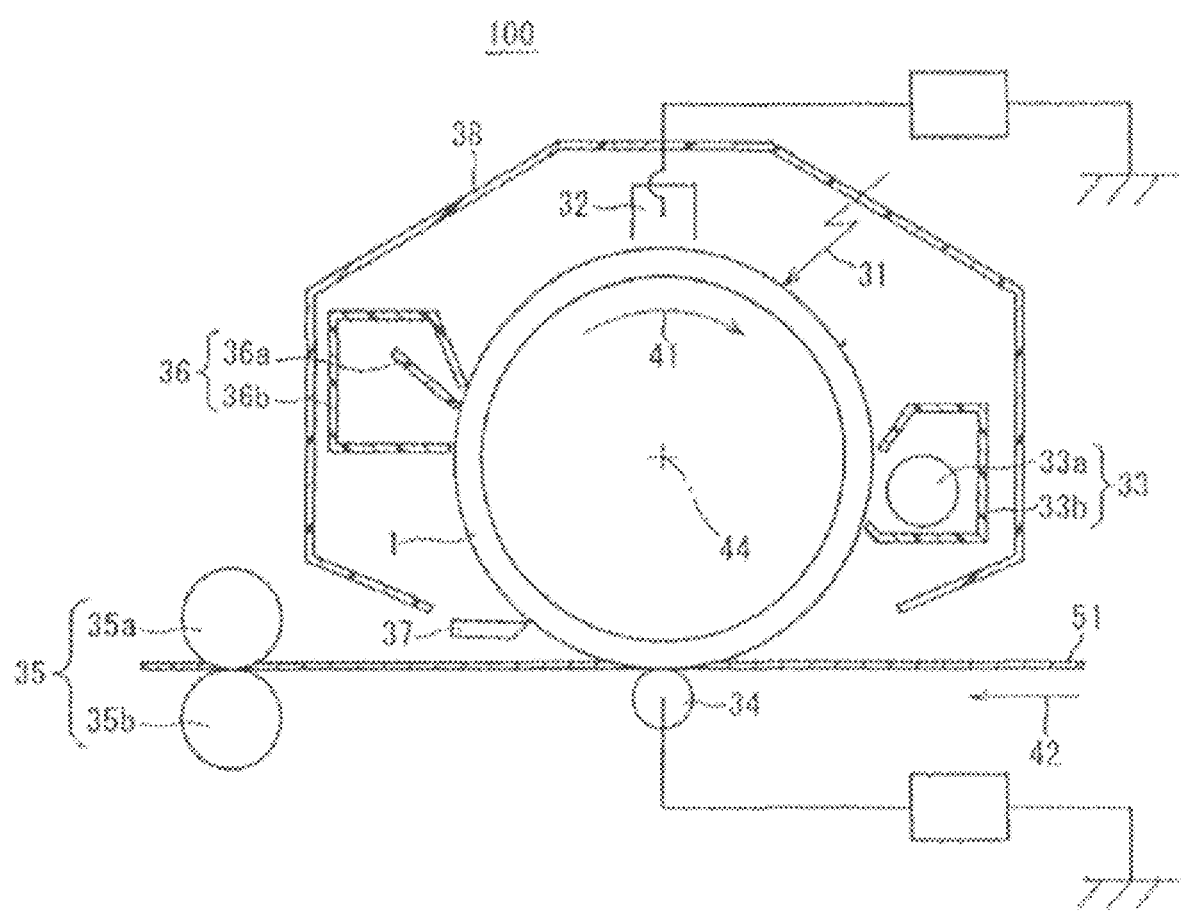
FIG. 2 is a typical side view illustrating a configuration of a main part of an image-forming apparatus according to an embodiment of the present invention.
Figure 3A:
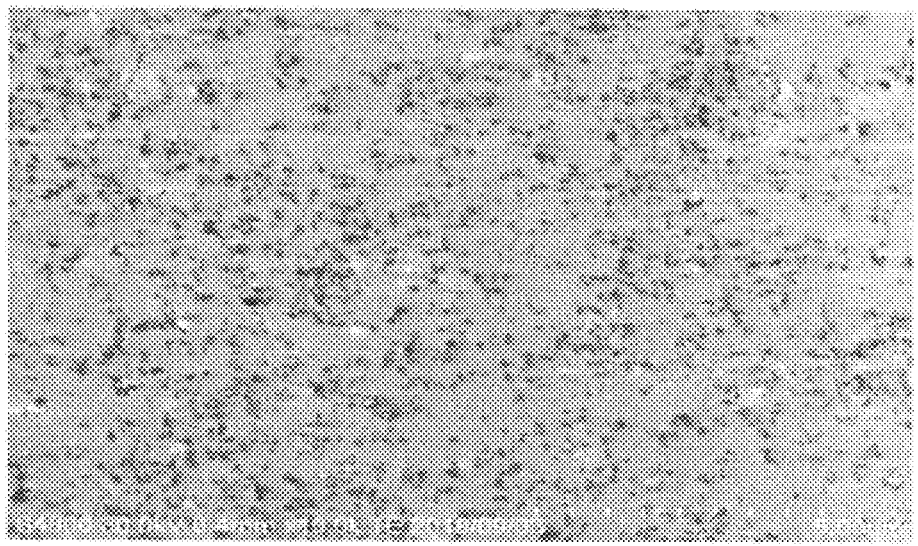
FIG. 3A shows an image of scanning transmission electron microscopy showing a state of dispersion of inorganic compound microparticles in an outermost surface layer of the photoconductor according to an embodiment of the present invention.
Figure 3B:
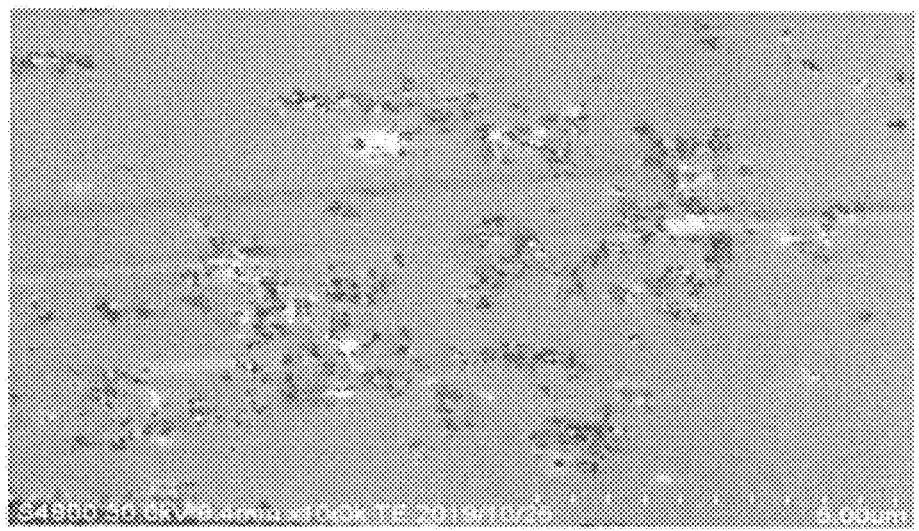
FIG. 3B shows an image of scanning transmission electron microscopy showing a state of dispersion of inorganic compound microparticles in an outermost surface layer of a conventional photoconductor.

The shape of the electrically-conductive base is not limited to a cylindrical shape (drum shape) as shown in FIG. 2, and may be a sheet shape, a column shape, an endless belt shape, or the like.

Moreover, for the purpose of prevention of interference fringes due to laser light, the surface of the electrically-conductive base may be applied with an anode oxide film treatment, a surface treatment with a chemical, hot water, or the like, coloring treatment, or a diffused reflection treatment such as roughening the surface, without affecting an image quality, as required.

Undercoating Layer (Also Referred to as "Middle Layer") 18

The photoconductor according to an embodiment of the present invention preferably includes an undercoating layer 18 between the electrically-conductive base 11 and the photoconductive layer 14.

The undercoating layer generally coats a projection and a cavity on the surface of the electrically-conductive base to provide evenness, increases film formation capability of the photoconductive layer, which is a charge generation layer in this case, suppresses peeling-off of the photoconductive layer from the electrically-conductive base, and improves adhesiveness between the electrically-conductive base and the photoconductive layer. In particular, it is possible to prevent injection of charge from the electrically-conductive base to the photoconductive layer, to prevent reduction of chargeability of the photoconductive layer, and to prevent image fog (so-called a black spot).

The undercoating layer can be formed by, for example, dissolving a binder resin in an appropriate solvent to prepare an application liquid for the undercoating layer, applying the application liquid on the surface of the electrically-conductive base, and removing an organic solvent by drying.

The binder resins include, in addition to binder resins similar to that included in the photoconductive layer described later, naturally-occurring macromolecular materials such as casein, gelatin, polyvinyl alcohol, ethyl cellulose, among which one type or two or more types can be used.

The binder resin is required to have characteristics such as not to develop dissolution in or swelling to a solvent used in forming the photoconductor layer on the undercoating layer, to have excellent adhesiveness to the electrically-conductive base, and to have flexibility. Accordingly, among the binder resins described above, a polyamide resin is preferable, and an alcohol-soluble nylon resin is more preferable.

Examples of the alcohol-soluble nylon resin include monopolymerized or copolymerized nylon such as 6-nylon, 66-nylon, 610-nylon, 11-nylon, and 12-nylon; and chemically-modified nylon resins such as N-alkoxy methyl-modified nylon.

Examples of the solvents to make the resin material dissolved or dispersed include water; alcohols such as methanol, ethanol, and butanol; glymes such as methyl carbitol and butyl carbitol; chlorine-based solvents such as dichloroethane, chloroform, or trichloroethane; acetone; dioxoran; and mixture solvents derived by mixing two or more types of these solvents. Among these solvents, in view of concern for the global environment, a non-halogen-based organic solvent is preferably used.

The application liquid for the undercoating layer may also contain inorganic compound microparticles. Such inorganic compound microparticles in the undercoating layer have an object of blending different from the inorganic compound microparticles in the outermost surface layer, and may be the same compound or a different one.

The inorganic compound microparticles can easily adjust a volume resistance value of the undercoating layer, further suppress injection of charge to the photoconductive layer, as well as maintain an electrical property of a photoconductor under a variety of environments.

Examples of the inorganic compound microparticles include titanium oxide, aluminum oxide, aluminum hydroxide, and tin oxide.

The ratio (C/D) of the total weight of the binder resin and the inorganic compound microparticles in the application liquid for the undercoating layer C to the weight of the solvent D is preferably 1/99-40/60, and particularly preferably 2/98-30/70.

In addition, the ratio E/F of the weight of the binder resin E to the weight of the inorganic compound microparticles F is preferably 90/10-1/99, and particularly preferably 70/30-5/95.

For the purpose of dispersing the inorganic compound microparticles into the application liquid for the undercoating layer, a known apparatus may be used such as a ball mill, a sand mill, an attritor, a vibration mill, a sonic disperser, or a paint shaker.

An application method of the application liquid for the undercoating layer is only required to be an optimal method selected appropriately in view of physical properties of the application liquid, productivity, and the like, and examples include spraying, bar coating, roll coating, a blade technique, a ring technique, and immersion application.

Among these, immersion application is a method of forming a layer on the surface of a substrate by immersing the substrate into an application tank filled with an application liquid and pulling up at a constant speed or a successively changing speed; is relatively easy; and has excellence in productivity and cost price, and thus can be preferably used for manufacturing the photoconductors. For the purpose of stabilizing dispersibility of the application liquid, an apparatus used for immersion application may include an application liquid dispersing apparatus represented by a sonic generating apparatus.

Natural drying may be used to remove a solvent in a coated film, but heating may be used to remove forcibly a solvent in a coated film.

The temperature in such drying process is not particularly limited as long as it is a temperature that can remove a solvent used, but it is appropriately about 50-140° C., and particularly preferably about 80-130° C.

With a drying temperature of less than 50° C., drying time may be longer, and furthermore, a solvent may not be evaporated sufficiently and remain in the photoconductor layer. Furthermore, with a drying temperature of more than about 140° C., electrical characteristics may deteriorate in repeated use of the photoconductor, leading to degradation of an image thus obtained.

Such condition of temperature is common not only in the case of the undercoating layer but also in layer formation of the photoconductive layer described later or the like and other treatments.

The film thickness of the undercoating layer is not particularly limited, but preferably 0.01-20 μm, and more preferably 0.05-10 μm.

With a film thickness of the undercoating layer of less than 0.01 μm, the layer may not substantially function as an undercoating layer, fail to coat a defect on the electrically-conductive base to provide an even surface property, and fail to prevent injection of charge from the electrically-conductive base to the photoconductive layer. On the other hand, with a film thickness of the undercoating layer of more than 20 μm, an even undercoating layer may be less likely to form, and sensitivity of the photoconductor may also be reduced.

Additionally, when a component material of the electrically-conductive base is aluminum, a layer containing alumite (alumite layer) can be formed to be as the undercoating layer.

Charge Generation Layer 15

The charge generation layer has a function to generate charge in an image-forming apparatus by absorbing irradiated light such as semiconductor laser light, and contains a charge generation substance as a main component, and as required, a binder resin, an additive, and the like.

As the charge generation substance, a compound used in the art can be used, and particular examples include azo-based pigments such as monoazo-based pigments, bisazo-based pigments, and trisazo-based pigments; indigo-based pigments such as indigo and thioindigo; perylene-based pigments such as perylene imide and perylene anhydride; polycyclic quinone-based pigments such as anthraquinone and pyrene quinone; phthalocyanine-based pigments such as metallic phthalocyanines including titanyl phthalocyanine and metal-free phthalocyanines; organic photoconductive materials such as squarylium dyes, pyrylium salts, thiopyrylium salts, and triphenylmethane-based pigments; and inorganic photoconductive materials such as selenium and amorphous silicon, from which one having sensitivity in an exposure wavelength range can be appropriately selected to be used. These charge generation substances can be used as one type alone or a combination of two or more types.

Among these charge generation substances, titanyl phthalocyanine represented by the following formula (A) is preferably used:

[Chem 1]

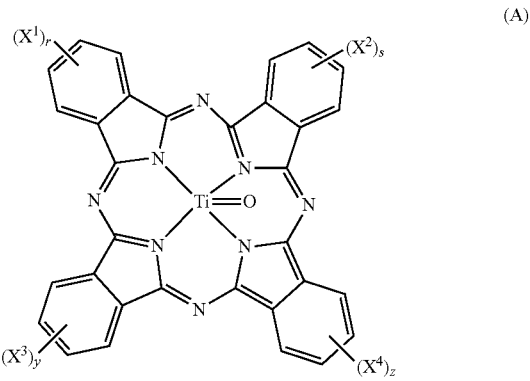

(A)

wherein $X^1$, $X^2$, $X^3$, and $X^4$ are identically or independently a halogen atom, an alkyl group, or an alkoxy group, and r, s, y, and z are identically or independently an integer of 0-4.

Titanyl phthalocyanine is a charge generation substance that has high charge generation efficiency and charge injection efficiency in an emission wavelength range of laser light and LED light currently and commonly used (near-infrared light), and can generate a large amount of charge by absorbing light, as well as efficiently inject the generated charge into a charge transport substance without accumulating inside.

Titanyl phthalocyanine represented by the general formula (A) can be produced by a known production method such as a method described in Moser, Frank H and Arthur L. Thomas, Phthalocyanine Compounds, Reinhold Publishing Corp., New York, 1963.

For example, among titanyl phthalocyanine compounds represented by the general formula (A), unsubstituted titanyl phthalocyanine in which r, s, y, and z are 0 can be obtained by heat melting phthalonitrile and titanium tetrachloride or heat reacting them in a suitable solvent such as α-chloronaphthalene, thereby synthesizing dichlorotitanyl phthalocyanine, and then hydrolyzing it with a base or water.

In addition, titanyl phthalocyanine composition can also be produced by heat reaction of isoindoline with titanium tetraalkoxide such as tetrabutoxytitanium in a suitable solvent such as N-methylpyrrolidone.

Methods of forming the charge generation layer include a method of vacuum depositing the charge generation substance on the electrically-conductive base, and a method of applying the application liquid for a charge generation layer obtained by dispersing the charge generation substance into a solvent, on the electrically-conductive base. Among these, preferable is a method of dispersing the charge generation substance into a binder resin solution obtained by mixing the binder resin into a solvent, in accordance with a conventional known method, and applying the application liquid for the charge generation layer on the electrically-conductive base. This method will be described below.

The binder resin is not particularly limited and can employ any resin known in the art, and examples can include polyester, polystyrene, polyurethane, phenol resins, alkyd resins, melamine resins, epoxy resins, silicone resins, acrylic resins, methacrylic resins, polycarbonate, polyarylate, polyphenoxy, resins such as polyvinyl butyral and polyvinyl formal, and copolymer resins containing two or more of repeated units composing these resins.

Examples of the copolymer resins include insulative resins such as vinyl chloride-vinyl acetate copolymer resins, vinyl chloride-vinyl acetate-maleic anhydride copolymer resins and acrylonitrile-styrene copolymer resins. These resins can be used as one type alone or a combination of two or more types.

Examples of the solvent include halogenated hydrocarbons such as dichloromethane and dichloroethane; ketones such as acetone, methylethylketone, and cyclohexanone; esters such as ethyl acetate and butyl acetate; ethers such as tetrahydrofuran (THF) and dioxane; alkyl ethers of ethylene glycol such as 1,2-dimethoxy ethane; aromatic hydrocarbons such as benzene, toluene, and xylene, or polar aprotic solvents such as N, N-dimethylformamide and N, N-dimethylacetamide. These solvents can be used as one type alone or a combination of two or more types.

In the blending ratio of the charge generation substance and the binder resin, the proportion of the charge generation substance is preferably in the range of 10-99% by mass.

With a proportion of the charge generation substance of less than 10% by mass, sensitivity may be reduced. On the other hand, with the proportion of the charge generation substance of more than 99% by mass, not only the film strength of the charge generation layer may reduce, but also dispersibility of the charge generation substance may reduce to enlarge large rough particles, thus reducing surface charge of an area other than a part to be deleted by exposure and generating many image defects, especially image fogs, so-called black spots, where toner adheres to a white ground and forms minute black dots.

Before dispersing the charge generation substance into the binder resin solution, the charge generation substance may be grinded with a grinder in advance. The grinders used for grinding include a ball mill, a sand mill, an attritor, a vibration mill, and a sonic disperser.

Dispersers used in dispersing the charge generation substance into the binder resin solution can include a paint shaker, a ball mill, and a sand mill. The condition of dispersion at that time is only required to be an appropriate condition selected so as not to induce contamination of impurities due to wear of a member configuring a container and a disperser to be used.

Methods of applying the application liquid for the charge generation layer include methods similar to the methods of applying the application liquid for the undercoating layer, and immersion application is particularly preferable.

The film thickness of the charge generation layer is not particularly limited, but is preferably 0.05-5 μm, and more preferably 0.1-1 μm.

With a film thickness of the charge generation layer of less than 0.05 μm, efficiency of light absorption may reduce, thus reducing sensitivity of the photoconductor. On the other hand, with the film thickness of the charge generation layer of more than 5 μm, charge transfer inside the charge generation layer may serve a rate-limiting step in a process of deleting charge on the photoconductive layer surface, thus reducing sensitivity of the photoconductor.

Charge Transport Layer 16

The charge transport layer has a function to receive charge generated in the charge generation substance and transport to the photoconductor surface, and contains a charge transport substance, the binder resin, and the inorganic compound microparticles, and as required, an additive.

As the charge transport substance, a compound used in the art can be used.

Particular examples include carbazole derivatives, pyrene derivatives, oxazole derivatives, oxadiazole derivatives, thiazole derivatives, thiadiazole derivatives, triazole derivatives, imidazole derivatives, imidazolone derivative, imidazolidine derivatives, bis(imidazolidine) derivatives, styryl compounds, hydrazone compounds, polycyclic aromatic compounds, indole derivatives, pyrazoline derivatives, oxazolone derivatives, benzimidazole derivatives, quinazoline derivatives, benzofuran derivatives, acridine derivatives, phenazine derivatives, aminostilbene derivatives, triarylamine derivatives, triarylmethane derivatives, phenylenediamine derivatives, stilbene derivatives, butadiene derivatives, enamine derivatives, benzidine derivatives, polymers having a group derived from these compounds in a main chain or a side chain (such as poly-N-vinyl carbazole, poly-1-vinyl pyrene, an ethylcarbazole-formaldehyde resin, triphenyl methane polymer, and poly-9-vinyl anthracene), and polysilane. These charge transport substances can be used as one type alone or a combination of two or more types.

Among these various charge transport substances, in view of electrical characteristics, durability, and chemical stability, stilbene derivatives, butadiene derivatives, enamine derivatives, and conjugates of several types of these compounds are preferable; stilbene derivatives are more preferable; and stilbene compounds represented by the following general formula (I) is particularly preferable:

[Chem 2]

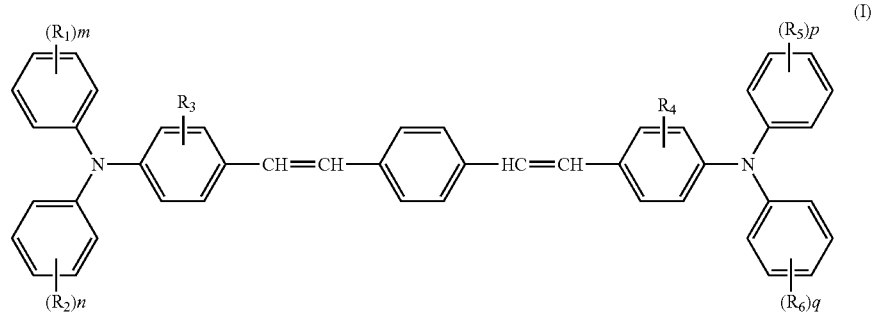

(I)

wherein $R_1$, $R_2$, $R_5$, and $R_6$ are identically or independently an alkyl group, an alkoxy group, an aryl group, or an aralkyl group; m, n, p, and q are identically or independently an integer of 0-3; and $R_3$ and $R4$ are identically or independently a hydrogen atom or an alkyl group.

Description will be made for substituents $R_1$, $R_2$, $R_5$, and $R_6$ in the general formula (I).

Examples of the alkyl groups include alkyl groups having a carbon number of 1-6 such as methyl, ethyl, n-propyl, isopropyl, n-butyl, isobutyl, sec-butyl, tert-butyl, n-pentyl, and n-hexyl.

Examples of the alkoxy groups include alkoxy groups having a carbon number of 1-6 such as methoxy, ethoxy, n-propoxy, isopropoxy, tert-butoxy, n-pentyloxy, and n-hexyloxy.

integer of 0-3. When the exponent is 2 or more, each of the substituents may be different from each other.

In addition, examples of the alkyl groups on the substituents $R_3$ and $R_4$ in the general formula (I) include alkyl groups having a carbon number of 1-3 such as methyl, ethyl, n-propyl, and isopropyl.

The stilbene compounds represented by the general formula (I) can be synthesized by, e.g., a method described in Japanese Patent No. 3272257.

Examples of the stilbene compounds represented by the general formula (I) include the following compounds (1)-(3), and in view of printing durability in forming the photoconductive layer, compound (1) is particularly preferable.

[Chem 3]

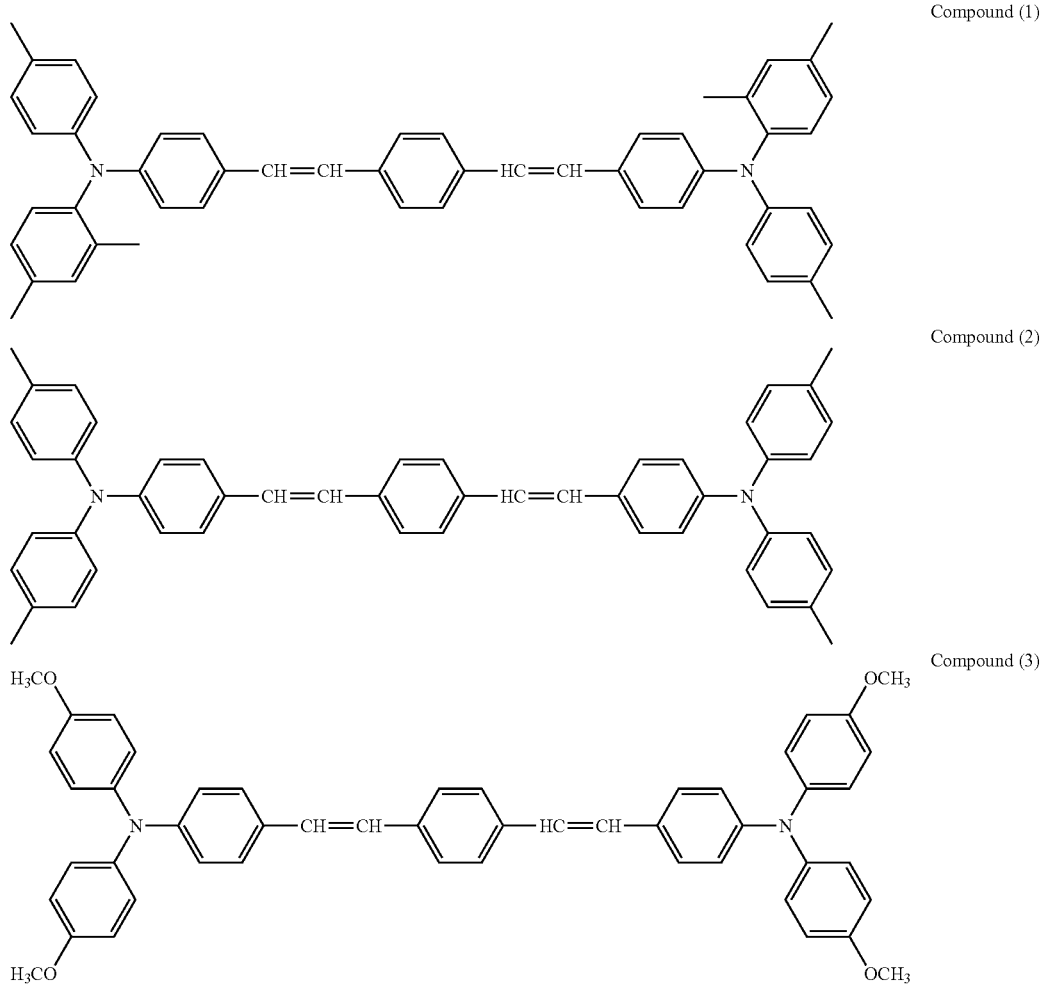

Compound (1)

Compound (2)

Compound (3)

Examples of the aryl groups include phenyl, naphthyl, anthryl, phenanthryl, fluorenyl, biphenylyl, and o-terphenyl.

Examples of the aralkyl groups include benzyl, phenethyl, benzhydryl, and trityl.

Examples of the halogen atoms include fluorine, chlorine, bromine, and iodine.

m, n, p, and q, which indicate exponents of the substituents $R_1$, $R_2$, $R_5$, and $R_6$, are identically or independently an A method of forming the charge transport layer is preferably a method of dispersing the charge transport substance and the inorganic compound microparticles into a binder resin solution derived by mixing the binder resin into a solvent, in accordance with a conventional known method, and applying the application liquid for the charge transport layer on the charge generation layer. This method will be described below.

The binder resin is not particularly limited and can employ any resin known in the art, and examples include vinyl polymer resins such as polymethylemethacrylate, polystyrene, polyvinyl chloride, and copolymer resins thereof; and resins such as polycarbonate, polyester, polyester carbonate, polysulfone, polyphenoxy, an epoxy resin, a silicone resin, polyarylate, polyphenyleneoxide, polyamide, polyether, polyurethane, polyacrylamide, and a phenol resin; and thermosetting resins having partially cross-linking of these resin. These binder resins can be used as one type alone or a combination of two or more types.

Among these, polystyrene, polycarbonate, polyarylate, and polyphenyleneoxide have a volume resistance value of $10^{13}\Omega$ or more and excellent electrical insulation properties, and also excellent film formation capability, potential characteristics, and the like, and polycarbonate is particularly preferable.

The ratio A/B of the charge transport substance (A) to the binder resin (B) is preferably used as 10/12-10/30.

With a ratio A/B of less than 10/30 and a high ratio of the binder resin, when the charge transport layer is formed by immersion application, the application liquid has increased viscosity, thus leading to reduction of an application speed and greatly deteriorating productivity. Moreover, when the content of the solvent in the application liquid is increased for preventing increase in viscosity of the application liquid, a brushing phenomenon may occur and generate white turbidity in the charge transport layer thus formed. On the other hand, with a ratio A/B of more than 10/12 and a reduced ratio of the binder resin, printing durability may be more reduced relative to the case with a high ratio of the binder resin, thus increasing the amount of wear of the photoconductive layer.

The content of the inorganic compound microparticles has a proportion of 7-18% by mass in the outermost surface layer, which is the charge transport layer in this case, as described in the item "Content of Inorganic Compound Microparticles".

For the purpose of improving film formation capability, flexibility, and surface smoothness, the charge transport layer may contain an additive such as a plasticizer or a leveling agent, as required.

Examples of the plasticizers include dibasic acid esters such as phthalic acid ester, fatty acid ester, phosphoric acid ester, chlorinated paraffin, and epoxy-type plasticizers.

Examples of the leveling agents include silicone-based leveling agents.

For the purpose of achieving to enhance mechanical strength, to improve electrical characteristics, and the like, the charge transport layer may also contain microparticles of an inorganic compound or an organic compound.

The solvents include aromatic hydrocarbons such as benzene, toluene, xylene, and monochlorobenzene; halogenated hydrocarbons such as dichloromethane and dichloroethane; ethers such as THF, dioxane, and dimethoxy methyl ether; and polar aprotic solvents such as N,N-dimethylformamide. Additionally, a solvent such as alcohols, acetonitrile, or methylethylketone can also be further added to be used, as required. Among these solvents, in view of concern for the global environment, a non-halogen-based organic solvent is preferably used. These solvents can be used as one type alone or a combination of two or more types.

The charge transport layer is formed by, e.g., as with the formation of the charge generation layer 15 described above, dissolving or dispersing the charge transport substance and the binder resin, and if required, the above-mentioned additive, into an appropriate solvent and preparing an application liquid for the charge transport layer, and applying the application liquid on the charge generation layer 15 by spraying, bar coating, roll coating, a blade technique, a ring technique, or immersion application. Among these application methods, immersion application is particularly excellent in view of various points as described above, and thus also often utilized in forming the charge transport layer.

The film thickness of the charge transport layer is not particularly limited, but is preferably 5-50 μm, and more preferably 10-40 μm.

With the film thickness of the charge transport layer of less than 5 μm, charge retention capability of the photoconductor surface may be reduced. On the other hand, with the film thickness of the charge transport layer of more than 50 μm, definition of the photoconductor may be reduced.

Surface Protective Layer

The surface protective layer has a function to improve durability of the photoconductor, and contains the binder resin and the inorganic compound microparticles, and as required, an additive. For the purpose of stabilization of electrical characteristics, the surface protective layer may also contain one type or two or more types of the charge transport substances as the same as in the charge transport layer.

As the binder resin, a resin having a binding property used in the art can be used, and exemplified by resins such as polystyrene, polyacetal, polyethylene, polycarbonate, polyarylate, polysulfone, polypropylene, and polyvinyl chloride. These binder resins can be used as one type alone or a combination of two or more types.

Among these, in view of a wear property and electrical characteristics, polycarbonate and polyarylate are particularly preferable.

The surface protective layer is formed by, e.g., as with the formation of the charge generation layer 15 and charge transport layer 16 described above, dissolving or dispersing the binder resin and the inorganic compound microparticles, and if required, the above-mentioned additive, into an appropriate solvent and preparing an application liquid for the surface protective layer, and applying the application liquid on the charge transport layer 16 by spraying, bar coating, roll coating, a blade technique, a ring technique, or immersion application. Among these application methods, immersion application is particularly excellent in view of various points as described above, and thus also often utilized in forming the surface protective layer.

The film thickness of the surface protective layer is not particularly limited, but is preferably 0.1-10 μm, and more preferably 1.0-8.0 μm.

A photoconductor used repeatedly for a long term is designed so as to be mechanically durable, and less likely to be worn. However, inside an actual machine, ozone and NOx gas or the like are generated from a charge member and the like and adheres to the surface of the photoconductor, and produces image deletion. For the purpose of preventing the image deletion, the photoconductive layer is required to be worn at a certain constant speed or more, and in view of concern for a long-term repeated use, the surface protective layer preferably has a film thickness of at least 1.0 μm or more. Additionally, with a film thickness of more than 8.0 μm of the surface protective layer, problems may occur such as rise of remaining potential and reduction in reproducibility of minute dots.

(2) Image-Forming Apparatus 100

The image-forming apparatus according to an embodiment of the present invention at least includes the photoconductor according to an embodiment of the present invention, a charging section to charge the photoconductor, an exposing section to expose the photoconductor thus charged and form an electrostatic latent image, a developing section to develop the electrostatic latent image formed by the exposure and form (visualize) a toner image, a transferring section to transfer on a recording medium the toner image formed by the development, a fixing section to fix on the recording medium the toner image thus transferred and form an image, a cleaning section to remove and recover toner remaining on the photoconductor, and a static eliminating section to eliminate surface charge remaining on the photoconductor.

With use of the drawings, description will now be made for the image-forming apparatus according to an embodiment of the present invention and operation thereof, but is not limited to the following description.

FIG. 2 is a typical side view illustrating a configuration of an image-forming apparatus according to an embodiment of the present invention.

The image-forming apparatus (laser printer) 100 in FIG. 2 is configured with including the photoconductor according to an embodiment of the present invention 1, an exposing section (semiconductor laser) 31, a charging section (charger) 32, a developing section (developer) 33, a transferring section (transfer charger) 34, a conveying belt (not depicted), a fixing section (fixture) 35, and a cleaning section (cleaner) 36. A symbol 51 indicates a recording medium (a recording paper sheet or a transfer paper sheet).

The photoconductor 1 is rotatably supported in the image-forming apparatus 100 body, and rotationally driven in a direction of an arrow symbol 41 around a rotation axis line 44 by a driving section not depicted. The driving section is configured with including, e.g., an electric motor and a reduction gear, and transmits the driving force to the electrically-conductive base configuring a core body of the photoconductor 1, thereby making the photoconductor 1 rotationally drive at a predetermined circumferential speed. The charging section (charger) 32, the exposing section 31, the developing section (developer) 33, the transferring section (transfer charger) 34, and the cleaning section (cleaner) 36 are disposed in this order, along the outer peripheral face of the photoconductor 1, from an upstream part to a downstream part in a rotational direction of the photoconductor 1 indicated by the arrow symbol 41.

The charger 32 is a charging section that charges uniformly the outer peripheral face of the photoconductor 1 to a predetermined potential.

The exposing section 31 includes a semiconductor laser as a light resource, and irradiates laser beam light output from the light source, onto the surface of photoconductor 1 between the charger 32 and the developer 33, thereby applying exposure corresponding to image information, onto the outer peripheral face of the photoconductor 1 charged. The light is scanned repeatedly in a direction of extension of the rotation axis line 44 of the photoconductor 1, which is a main scanning direction, and these create an image and serially forms an electrostatic latent image on the surface of the photoconductor 1. In other words, presence and absence of laser beam irradiation generate difference in the amount of charge on the photoconductor 1 charged uniformly by the charger 32, and form an electrostatic latent image.

The developer 33 is a developing section that develops the electrostatic latent image, which is formed on the surface of the photoconductor 1 by exposure, with a developing agent (toner); is disposed with facing the photoconductor 1; and includes a development roller 33a that supplies toner to the outer peripheral face of the photoconductor 1, and a casing 33b that rotatably supports the development roller 33a around a rotation axis line parallel to the rotation axis line 44 of the photoconductor 1, as well as contains the developing agent including toner within the inner space.

The transfer charger 34 is a transferring section that transfers the toner image, which is a visible image formed on the outer peripheral face of the photoconductor 1 by the development, on a transfer paper sheet 51, which is a recording medium supplied between the photoconductor 1 and the transfer charger 34 from a direction of an arrow symbol 42 by a conveying section not depicted. The transfer charger 34 is a contact transferring section that includes, e.g., a charging section, and provides polar charge opposite to toner on the transfer paper sheet 51, thereby transferring the toner image onto the transfer paper sheet 51.

The cleaner 36 is a cleaning section that removes and recovers toner remaining on the outer peripheral face of the photoconductor 1 after the transferring operation by the transfer charger 34, and includes a cleaning blade 36a that peels off the toner remaining on the outer peripheral face of the photoconductor 1, and a collecting casing 36b that contains the toner peeled off by the cleaning blade 36a. The cleaner 36 is also disposed with a static eliminating lamp not depicted.

The image-forming apparatus 100 also includes a fixture 35, which is a fixing section that fixes the image thus transferred, in a downstream part to which the transfer paper sheet 51 passed between the photoconductor 1 and the transfer charger 34 is to be conveyed. The fixture 35 includes a heating roller 35a that has a heating section not depicted, and a compression roller 35b that is disposed with facing the heating roller 35a and compressed by the heating roller 35a to form a contact part.

The symbol 37 indicates a separating section that separates the transfer paper sheet and the photoconductor, and the symbol 38 indicates a casing that contains each of the section described above in the image-forming apparatus.

An image forming operation by the image-forming apparatus 100 is performed as follows.

First, once the photoconductor 1 is rotationally driven in the direction of the arrow symbol 41 by the driving section, the surface of the photoconductor 1 is uniformly charged to a predetermined positive potential by the charger 32 disposed in the proximity of the upstream part of the rotational direction of the photoconductor 1 relative to an image formation point of the light by the exposing section 31.

Then, light corresponding to image information is irradiated from the exposing section 31 to the surface of the photoconductor 1. In the photoconductor 1, the exposure removes surface charge of an area irradiated with the light, generates a difference between a surface potential of the area irradiated with the light and a surface potential of an area unirradiated with light, and forms an electrostatic latent image.

From the developer 33 disposed in the proximity of the downstream part of the rotational direction of the photoconductor 1 relative to the image formation point of the light by the exposing section 31, toner is supplied onto the surface of the photoconductor 1 forming an electrostatic latent image, and then the electrostatic latent image is developed to form a toner image.

With synchronization with the exposure to the photoconductor 1, the transfer paper sheet 51 is supplied between the photoconductor 1 and the transfer charger 34. The transfer charger 34 provides the transfer paper sheet 51 thus supplied with polar charge opposite to the toner, and transfers the toner image formed on the surface of the photoconductor 1 onto the transfer paper sheet 51.

The transfer paper sheet 51 having the toner image thus transferred is conveyed to the fixture 35 by a conveying section, heated and compressed in passing through the contact part of the heating roller 35a and the compression roller 35b of the fixture 35, and the toner image is fixed on the transfer paper sheet 51 to be a robust image. The transfer paper sheet 51 having an image formed in this manner is discharged out of the image-forming apparatus 100 by the conveying section.

Meanwhile, toner still remaining on the surface of the photoconductor 1 after the transfer of the toner image by the transfer charger 34 is peeled off and recovered from the surface of the photoconductor 1 by the cleaner 36. The charge on the surface of the photoconductor 1 that experiences removal of the toner in this manner is removed by light emitted from the charge eliminating lamp, and the electrostatic latent image on the surface of the photoconductor 1 disappears. Then, the photoconductor 1 is further rotationally driven, and the series of operations from charging is repeated again to form images consecutively.

EXAMPLES

Hereinafter, the present invention will be particularly described with use of Examples and Comparative Examples on the basis of the drawings, but these Example does not limit the present invention.

In addition, measurements were made for void ratios E of inorganic compound microparticles used in Examples and Comparative Examples; number mean primary particle diameters of the inorganic compound microparticles; indicators of states of dispersion of the inorganic compound microparticles, $S_{Ave}/N$, and maximum gap regions, and mean sizes of the inorganic compound microparticles in outermost surface layers, and surface roughness of the outermost surface layers Rz, as follows.

Void Ratio of Inorganic Compound Microparticles, $\varepsilon$

A corresponding volume of inorganic compound microparticles is added to a 250 mL-volume graduated cylinder, and the weight (g) is divided by a cubic volume ($cm^3$) after standing 2 minutes to calculate a bulk density rB ($g/cm^3$), which is then combined with a true density rS ($g/cm^3$) of a physical property value inherent in an inorganic compound in the inorganic compound microparticles to derive a void ratio E in accordance with the formula: $\varepsilon=1-rB/rS$.

Number Mean Primary Particle Diameter of Inorganic Compound Microparticles

The number mean primary particle diameter is measured by magnifying inorganic compound microparticles 30,000-300,000 times, e.g., 10,000 times, with scanning electron microscopy, observing randomly 100 particles as primary particles, and deriving a measured value as a mean Feret's direction diameter by image analysis.

$S_{Ave}/N$ of Inorganic Compound Microparticles, Maximum Gap Region, and Mean Size of Inorganic Compound Microparticles An outermost surface layer of a photoconductor is peeled off, and sliced in its stack direction with a thickness of 70 nm using an ultramicrotome (manufactured by Reichert-Jung Ltd., model: ULTRACUT N) to make a strip-shaped flake (sample piece) of a photoconductive layer. For the sample piece thus obtained, a field of view in microscopy is magnified under conditions with an observation mode of dark field image and an acceleration voltage of 30 kV using a scanning transmission electron microscope (STEM, manufactured by Hitachi High-Technologies Corporation, model: S-4800) to make cross-sectional slices as measurement samples for 50 points. Photos are further taken for them, and the image analysis software ImageJ is applied for 5 μm×5 μm areas in the photos of the STEM surface observation to derive the total area of the photoconductive layer $S_{total}$ and the total area of the inorganic compound microparticles $S_{sa}$ for each of the measurement samples, thereby deriving a mean value $S_{Ave}$ of these samples for the 50 points.

$S_{Ave}/N$ is derived from the mean value $S_{Ave}$ thus obtained and the total solid content of the outermost surface layer (g).

Figure 4:
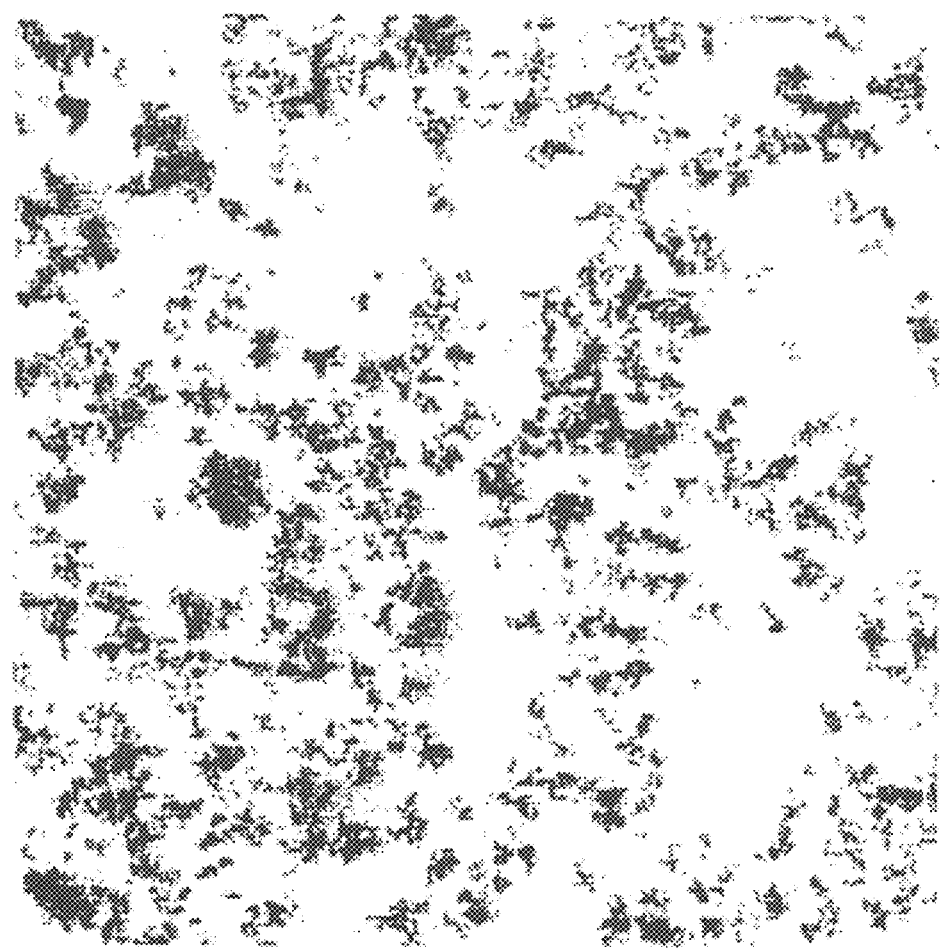
FIG. 4 shows an example of 8-bit binary images of cross-sectional images in scanning transmission electron microscopy of the photoconductor according to an embodiment of the present invention.

The image file thus obtained is converted to an 8-bit binary image, and Upper Level Lower/Level of Threshold is set so as to best identify an area of a separate inorganic compound particle (filler) on an image, and to minimize noise. Furthermore, in a command "Analyze Particle", 0.0001 $\mu m^2$-infinity is input as the lower limit of an area intended to be extracted in Size, MASK is input in Show, and then OK is pressed with checking the boxes "Display results", "Exclude on edges", and "Include holes", thereby outputting individual areas of the filler regions identified with binarization as Results. At that time, a mean for occupied areas $S_{Ave}$ is calculated. Furthermore, the maximum value of an equivalent circle diameter of a space with absence of the filler is calculated from the binary image, and defined as a maximum gap region (μm). FIG. 4 shows a binary image in Example 1.

Magnification of the microscope can be adjusted to magnify a particle diameter of the filler to be unmeasurable, and the image analysis software ImageJ can be applied for the cross-sectional photo to derive a primary particle diameter of the inorganic microparticle. The particle diameter of the inorganic microparticles is defined as a maximum distance between two parallel lines when the two parallel lines are drawn with passing contact points of both ends of a microparticle. A mean size ($\mu m^2$) is calculated from a mean value for samples of any 50 points.

Surface Roughness of Outermost Surface Layer, Rz

Surface roughness of the central part Rz (μm) is measured at a measurement position in a horizontal direction of the outermost surface layer of the photoconductor as an axis, at a standard length of 0.8 mm, a cutoff wavelength of 0.8 mm, and a measurement speed of 0.1 mm/sec, in the cutoff type Gaussian method using a surface roughness measurement apparatus (manufactured by Tokyo Seimitsu Co., Ltd., model: Surfcom1400D).

Example 1

Three mass parts of titanium oxide (manufactured by Ishihara Sangyo Kaisha, Ltd., product name: Tipaque TTO-D-1) and 2 mass parts of copolymerized polyamide (nylon) (manufactured by Toray Industries, Inc., product name: AMILANTM, grade: CM8000) were added to 25 mass parts of methylalcohol and dispersed in a paint shaker for 8 hours to prepare 3 litters of an application liquid for an undercoating layer.

The application liquid for an undercoating layer thus obtained was filled in an application layer, and an aluminum drum-shaped base having a diameter of 30 mm and a length of 255 mm as the electrically-conductive base 11 was immersed in and then pulled up.

The coating film thus obtained was dried naturally to form the undercoating layer 18 having a film thickness of 1 μm on the electrically-conductive base 11.

The titanyl phthalocyanine represented by the following structural formula, which is to be used as a charge generation substance, was prepared in advance.

[Chem 4]

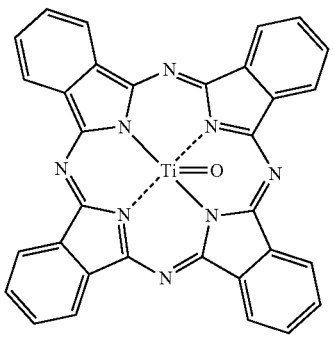

After mixing 29.2 g of diiminoisoindoline and 200 mL of sulfolane, 17.0 g of titanium tetraisopropoxide was further added, and reacted under nitrogen atmosphere at 140° C. for 2 hours. The reaction mixture thus obtained was allowed to cool, and then a precipitate was filtered off, washed serially with chloroform and 2% aqueous hydrochronic acid solution, further washed serially with water and methanol, and dried to provide 25.5 g of a violet crystal.

Chemical analysis of the compound thus obtained provided confirmation of the titanyl phthalocyanine represented by the structural formula described above (yield: 88.5%). One mass part of titanyl phthalocyanine thus obtained and 1 mass part of a butyral resin (manufactured by Sekisui Chemical Co., Ltd., product name: S-LEC BM-2) were added to 98 mass parts of methylethylketone, and dispersed with a paint shaker for 2 hours to prepare 3 litters of an application liquid for a charge generation layer.

The application liquid for a charge generation layer thus obtained was applied on the undercoating layer 18 in an immersion technique similar to the case of formation of the undercoating layer, and the coating film thus obtained was dried naturally to form the charge generation layer 15 having a film thickness of 0.3 μm.

Then, to a 900 mL-volume glass container, 7 g of silica particles (having a number mean primary particle diameter of 16 nm, a bulk density of 0.05 g/cm$^3$, a true density of 2.65 g/cm$^3$, surface-treated with dimethyldichlorosilane, and manufactured by Nippon Aerosil Co., Ltd., product name: AEROSIL® R972), 25 g of compound (1) represented by the following structural formula as a charge transport substance, 37.5 g of polycarbonate (manufactured by Teijin Chemicals Ltd., product name: TS2050), and 272.5 g of tetrahydrofuran were added, mixed, and stirred in a ball mill for 30 hours. The mixture thus obtained was dispersed via 10 passes using a particle dispersing apparatus (manufactured by Microfluidics Corporation, model: Microfluidizer M110P) to prepare 319.2 g of an application liquid for a charge transport layer. The application liquid for a charge transport layer thus obtained was transferred to a glass container, subjected to roll stirring in a ball mill for 12 hours, and left standing under a condition at 20° C. for 3 days after the end of stirring, to prepare an application liquid for a charge transport layer.

[Chem 5]

Compound (1)

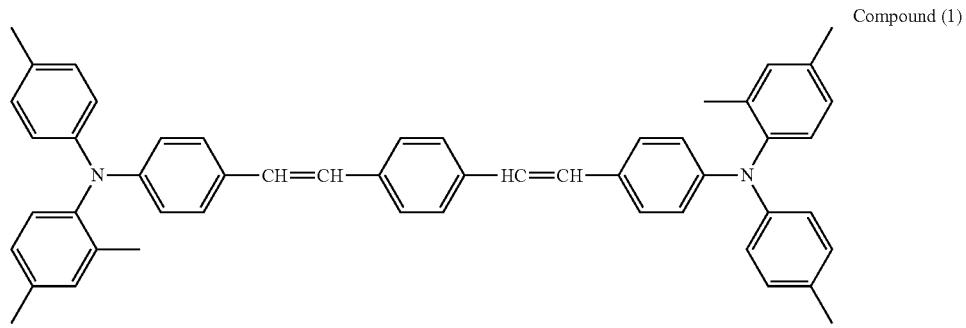

The application liquid for a charge transport layer thus obtained was applied on the charge generation layer 15 in an immersion technique similar to the case of formation of the undercoating layer, and the coating film thus obtained was dried at 115° C. for 1.5 hours to form the charge transport layer 16 having a film thickness of 35 μm, thus providing the photoconductor 1 shown in FIG. 1.

Compound (1) (stilbene compound) prepared in advance in accordance with a method described in Japanese Patent No. 3272257 was used as a charge transport substance.

Example 2

The photoconductor 1 was made in the same manner as Example 1, except for replacing dispersion of 10 passes with dispersion of 20 passes by a particle dispersion apparatus, in preparation of the application liquid of a charge transport layer.

Example 3

The photoconductor 1 was made in the same manner as Example 1, except for replacing dispersion of 10 passes with dispersion of 2 passes by a particle dispersion apparatus, in preparation of the application liquid of a charge transport layer.

Example 4

The photoconductor 1 was made in the same manner as Example 1, except for using silica particles (having a number mean primary particle diameter of 40 nm, a bulk density of 0.17 g/cm$^3$, a true density of 2.65 g/cm$^3$, surface-treated with hexamethyldisilazane, and manufactured by Nippon Aerosil Co., Ltd., product name: AEROSIL® RX50), in preparation of the application liquid of a charge transport layer.

Example 5

The photoconductor 1 was made in the same manner as Example 1, except for replacing 7 g of silica particles (having a number mean primary particle diameter of 16 nm, a bulk density of 0.05 g/cm$^3$, a true density of 2.65 g/cm$^3$, surface-treated with dimethyldichlorosilane, and manufactured by Nippon Aerosil Co., Ltd., product name: AEROSIL® R972) with 14 g, in preparation of the application liquid of a charge transport layer.

Example 6

The photoconductor 1 was made in the same manner as Example 1, except for replacing 7 g of silica particles (having a number mean primary particle diameter of 16 nm, a bulk density of 0.05 g/cm$^3$ a true density of 2.65 g/cm$^3$, surface-treated with dimethyldichlorosilane and manufactured by Nippon Aerosil Co., Ltd., product name: AEROSIL® R972) with 5 g, in preparation of the application liquid of a charge transport layer.

Example 7

The photoconductor 1 was made in the same manner as Example 1, except for using silica particles (having a number mean primary particle diameter of 16 nm, a bulk density of 0.05 g/cm$^3$, a true density of 2.65 g/cm$^3$, surface-treated with dimethylpolysiloxane, and manufactured by Nippon Aerosil Co., Ltd., product name: AEROSIL® RY200S), and standing under a condition at 25° C. for a day before stirring in a ball mill, in preparation of the application liquid of a charge transport layer.

Example 8

The photoconductor 1 was made in the same manner as Example 1, except for using silica particles (having a number mean primary particle diameter of 16 nm, a bulk density of 0.05 g/cm$^3$, a true density of 2.65 g/cm$^3$, surface-treated with hexamethyldisilazane, and manufactured by Nippon Aerosil Co., Ltd., product name: AEROSIL®Admafine NX-130), in preparation of the application liquid of a charge transport layer.

Example 9

The photoconductor 1 was made in the same manner as Example 1, except for not forming the undercoating layer 18 on the electrically-conductive base 11.

Example 10

In the same manner as Example 1, the undercoating layer 18 and the charge generation layer 15 were formed on the electrically-conductive base 11.

Then, to a 900 mL-volume glass container, 25 g of compound (1) as a charge transport substance, 37.5 g of polycarbonate (manufactured by Teijin Chemicals Ltd., product name: TS2040), and 250 g of tetrahydrofuran were added, mixed, and stirred in a ball mill for 15 hours to prepare 312.5 g of an application liquid for charge transport.

The application liquid for a charge transport layer thus obtained was applied on the charge generation layer 15 in an immersion technique similar to the case of formation of the undercoating layer, and the coating film thus obtained was dried at 115° C. for 1.5 hours to form the charge transport layer having a film thickness of 35 μm.

Then, to a 900 mL-volume glass container, 25 g of compound (1) as a charge transport substance, 37.5 g of polycarbonate (manufactured by Teijin Chemicals Ltd., product name: TS2050), 200 g of tetrahydrofuran, and 55.3 g of alumina microparticle slurry (having a mean particle diameter of 31 nm, a solid content of 15%, tetrahydrofuran (THF) solvent, manufactured by CI Kasei Co., Ltd. (current CIK NanoTech Corporation)) were added, mixed, and stirred in a ball mill for 30 hours, and the mixture thus obtained was dispersed via 10 passes using a particle dispersion apparatus (manufactured by Microfluidics Corporation, model: Microfluidizer M110P) to prepare 317.5 g of an application liquid for a surface protective layer. The application liquid for a surface protective layer thus obtained was transferred to a glass container, subjected to roll stirring in a ball mill for 12 hours, and left standing under a condition at 20° C. for 3 days after the end of stirring, to prepare an application liquid for a surface protective layer.

The application liquid for a surface protective layer thus obtained was applied on the charge transport layer 16 by spray painting, and the coating film thus obtained was dried at 120° C. for 0.5 hours to form a surface protective layer having a film thickness of 5 μm, thus providing a photoconductor having a surface protective layer (not depicted) on the outermost surface layer of the photoconductor 1 shown in FIG. 1.

Example 11

In the same manner as Example 10, the undercoating layer 18, the charge generation layer 15, and the charge transport layer 16 were formed on the electrically-conductive base 11.

To a 900 mL-volume glass container, 25 g of compound (1) as a charge transport substance, 37.5 g of polycarbonate (manufactured by Teijin Chemicals Ltd., product name: TS2050), 200 g of tetrahydrofuran, and 8.3 g of silica particle (having a number mean primary particle diameter of 16 nm, a bulk density of 0.05 g/cm$^3$, a true density of 2.65 g/cm, surface-treated with dimethyldichlorosilane, and manufactured by Nippon Aerosil Co., Ltd., product name: AEROSIL® R972) were added, mixed, and stirred in a ball mill for 30 hours, and the mixture thus obtained was dispersed via 10 passes using a particle dispersion apparatus (manufactured by Microfluidics Corporation, model: Microfluidizer M110P) to prepare 260.3 g of an application liquid for a surface protective layer. The application liquid for a a surface protective layer thus obtained was transferred to a glass container, subjected to roll stirring in a ball mill for 12 hours, and left standing under a condition at 20° C. for 3 days after the end of stirring, to prepare an application liquid for a surface protective layer.

The application liquid for a surface protective layer thus obtained was applied on the charge transport layer 16 by spray painting, and the coating film thus obtained was dried at 120° C. for 0.5 hours to form a surface protective layer having a film thickness of 5 µm, thus providing a photoconductor having a surface protective layer (not depicted) on the outermost surface layer of the photoconductor 1 shown in FIG. 1.

Example 12

The photoconductor 1 was made in the same manner as Example 1, except for using silica particles (having a number mean primary particle diameter of 16 nm, a bulk density of 0.07 g/cm$^3$, a true density of 2.65 g/cm$^3$, surface-treated with hexamethyldisilazane, and manufactured by Nippon Aerosil Co., Ltd., product name: AEROSIL® R972V), in preparation of the application liquid of a charge transport layer.

Comparative Example 1

The photoconductor 1 was made in the same manner as Example 1, except for not performing dispersion of 10 passes by a particle dispersion apparatus, in preparation of the application liquid of a charge transport layer.

Comparative Example 2

The photoconductor 1 was made in the same manner as Example 1, except for replacing dispersion of 10 passes with dispersion of 1 passes by a particle dispersion apparatus, in preparation of the application liquid of a charge transport layer.

Comparative Example 3

The photoconductor 1 was made in the same manner as Example 1, except for using silica particles (having a number mean primary particle diameter of 7 nm, a bulk density of 0.05 g/cm$^3$, a true density of 2.65 g/cm$^3$, surface-treated with dimethylpolysiloxane, and manufactured by Nippon Aerosil Co., Ltd., product name: AEROSIL® R976), in preparation of the application liquid of a charge transport layer.

Comparative Example 4

The photoconductor 1 was made in the same manner as Example 1, except for using silica particles (having a number mean primary particle diameter of 200-400 nm, a true density of 2.65 g/cm$^3$, surface untreated, and manufactured by Admatechs Co., Ltd., product name: high-purity synthesized spherical silica Admafine SO-E1) in the same manner as Example 8, using a polypropylene container instead of a glass container, and replacing stirring in a ball mill for 30 hours with that for 15 hours, in preparation of the application liquid of a charge transport layer.

Comparative Example 5

The photoconductor 1 was made in the same manner as Example 1, except for using 35 g of silica particles (having a number mean primary particle diameter of 40 nm, a bulk density of 0.17 g/cm, a true density of 2.65 g/cm$^3$, surface-treated with hexamethyldisilazane, and manufactured by Nippon Aerosil Co., Ltd., product name: AEROSIL® RX50) in the same manner as Example 4, in preparation of the application liquid of a charge transport layer.

Comparative Example 6

The photoconductor 1 was made in the same manner as Example 1, except for replacing 70 g of silica particles (having a number mean primary particle diameter of 16 nm, a bulk density of 0.05 g/cm$^3$, a true density of 2.65 g/cm$^3$, surface-treated with dimethyldichlorosilane, and manufactured by Nippon Aerosil Co., Ltd., product name: AEROSIL® R972) with 150 g, in preparation of the application liquid of a charge transport layer.

Evaluation

Initial sensitivity, printing durability, charge stability, and cleanability were assessed by mounting the photoconductors made in Examples 1-11 and Comparative Examples 1-6 on a unit in a digital copier (manufactured by Sharp Corporation, model: MX-B455W) remodeled for tests, and forming 300 thousand images, as follows.

Initial Sensitivity

A photoconductor surface potential in a development part, particularly a photoconductor surface potential of a black background area VL (−V) in performing exposure to examine sensitivity, was measured, and initial sensitivity was assessed on the basis of the following criteria.

Measurement was performed by removing a developer from the test-use digital copier, and instead, disposing a surface electrometer (manufactured by Trek Japan K. K., model: MODEL 344) at the development site.

Criteria

A: VL(−V)<80

Available without any trouble even in a high-speed multifunction printer or printer required to have high sensitivity.

B: 80≤VL(−V)<110

Available without any trouble in a low to middle speed multifunction printer or printer.

C: 110≤VL(−V)<140

Available without any trouble despite having a slightly thin density in the case of a low-speed, low-price multifunction printer or printer.

D: 140≤VL(−V)

Having a low density due to low sensitivity, and problematic in actual use.

Printing Durability

A cleaning blade of a cleaner disposed in the digital multifunction printer was adjusted so as to have a pressure for contact with the photoconductor, so-called a cleaning blade pressure, of 21 gf/cm ($2.06 \times 10^{-1}$ N/cm: initial linear pressure). A printing durability test was performed by printing a lettering test chart (ISO19752) on 300 thousand recording paper sheets under a normal temperature/normal humidity environment at a temperature of 25° C./a relative humidity of 50%.

The thicknesses of the photoconductive layer at the start of the printing durability test and after formation of 300 thousand images were measured using a film thickness measurement apparatus (manufactured by Filmetrics Japan, Inc., model: F-20-EXR).

The shaving amount per 100 thousand rotations of the photoconductor drum was derived from a difference between the film thicknesses of the photoconductor at the start of the printing durability test and after formation of 300 thousand images, and printing durability was assessed on the basis of the following criteria.

Here, more shaving amount was assessed as lower printing durability.

Criteria

A: Shaving amount<0.50 μm/100 thousand rotations

Available without any trouble even in a multifunction printer or printer required to have long life.

B: 0.50 μm/100 thousand rotations≤shaving amount<0.70 μm/100 thousand rotations

Available without any trouble in the case of a multifunction printer or printer other than that required to have long life, despite having slightly more shaving amount.

C: 0.70 μm/100 thousand rotations≤shaving amount<0.85 μm/100 thousand rotations

Available without any trouble in the case of a low-price multifunction printer or printer, despite having more shaving amount.

D: 0.85 μm/100 thousand rotations≤shaving amount

Having more shaving amount and problematic in actual use.

Charge Stability

A photoconductor (drum) to be assessed was disposed inside the test-use copier, and a process consisting of only charging, exposing, and static eliminating was repeated 600,000 times under a normal temperature/low-humidity environment at a temperature of 25° C./a relative humidity of 10%; an initial charge potential and a charge potential after energization fatigue were measured; and their difference $\Delta V0$ was used to assess charge stability on the basis of the following criteria, and defined as an indicator of charge reduction under a low-humidity environment.

Criteria

A: $0 \leq \Delta V0\ (-V) < 60$

Very good, and available without any problem even in a high-speed multifunction printer or printer required to have high sensitivity.

B: $60 \leq \Delta V0(-V) < 80$

Good, and available without any problem in a low to middle speed multifunction printer or printer.

C: $80 \leq \Delta V0(-V) < 100$

Slightly good, and available without any problem despite providing a slightly thin density in the case of a low-speed, low-price multifunction printer or printer.

D: $100 \leq \Delta V0(-V)$

Not good, and problematic in actual use.

Cleanability

For checking the level of generation of poor cleaning on a photoconductor after the printing durability test, the photoconductor after forming 300 thousand images was set on the test-use digital copier; an untransferred image with 100% density was output on one A4 sheet; and immediately after that, the image-forming apparatus is forcibly stopped; the surface of the photoconductor was visually observed; and cleanability (degree of defect) was assessed on the basis of the following criteria.

Criteria

A: No generation of poor cleaning.

Available without any problem even in a multifunction printer or printer required to have high definition.

B: Presence of 1-2 lines of poor cleaning.

Available without any problem in the case of a multifunction printer or printer other than that required to have high definition.

C: Presence of 3-5 lines of poor cleaning.

Available without any problem in the case of a low-price multifunction printer or printer.

D: Presence of a large number of lines of poor cleaning.

Problematic in actual use.

Overall Evaluation

On the basis of the results of judgement for the assessments described above, photoconductors were subjected to overall evaluation in accordance with the following criteria.

A: Grade A in all items, and very good.

Available without any problem even in a multifunction printer or printer required to have long life and high definition.

B: Grade B or more in all items despite including grade B in any of the judgements. Available without any problem in the case of a multifunction printer or printer other than that required to have long life and high definition.

C: Grade C or more in all items despite including grade C in any of the judgements.

Available without any problem in the case of a low-price multifunction printer or printer.

D: Including grade D in any of the judgements.

Not available in actual use.

Table 1 shows main component materials and physical properties of the outermost surface layers of the photoconductors thus made, and Table 2 shows results of measurements and judgements thus obtained.

Characters in Material of Inorganic compound microparticles in Table 1 mean product names, and abbreviations in Surface treating material mean the following compounds:

DMDCS: dimethyldichlorosilane

HMDS: hexamethyldisilazane

DMPS: dimethylpolysiloxane

TABLE 1

| | | Outermost surface layer | | | | | |
|---|---|---|---|---|---|---|---|
| | | | Inorganic compound microparticles | | | | Dispersion of application liquid |
| | Target layer | Material | Mean primary particle diameter (nm) | Surface treating material | Content (mas part) (in outermost surface layer) | Charge transfer material | The number of passes (times) |
| Example 1 | Charge transfer | R972 | 16 | DMDCS | 10 | Compound (1) | 10 |
| Example 2 | Charge transfer | R972 | 16 | DMDCS | 10 | Compound (1) | 20 |
| Example 3 | Charge transfer | R972 | 16 | DMDCS | 10 | Compound (1) | 2 |
| Example 4 | Charge transfer | RX50 | 40 | HMDS | 10 | Compound (1) | 10 |
| Example 5 | Charge transfer | R972 | 16 | DMDCS | 18 | Compound (1) | 10 |
| Example 6 | Charge transfer | R972 | 16 | DMDCS | 7 | Compound (1) | 10 |

TABLE 1-continued

| | | | | | | | | |
|---|---|---|---|---|---|---|---|---|
| Example 7 | Charge transfer | RY200S | 16 | DMDCS | 10 | Compound (1) | 10 |
| Example 8 | Charge transfer | NX130 | 16 | DMDCS | 10 | Compound (1) | 10 |
| Example 9 | Charge transfer | R972 | 16 | DMDCS | 10 | Compound (1) | 10 |
| Example 10 | Surface protective | * | 31 | — | 11.7 | Compound (1) | 10 |
| Example 11 | Surface protective | R972 | 16 | DMDCS | 11.7 | Compound (1) | 10 |
| Example 12 | Charge transfer | R972V | 16 | DMDCS | 10 | Compound (1) | 10 |
| Comparative Example 1 | Charge transfer | R972 | 16 | DMDCS | 10 | Compound (1) | — |
| Comparative Example 2 | Charge transfer | R972 | 16 | DMDCS | 10 | Compound (1) | 1 |
| Comparative Example 3 | Charge transfer | R976 | 7 | DMDCS | 10 | Compound (1) | 10 |
| Comparative Example 4 | Charge transfer | SOE1 | 200-400 | — | 10 | Compound (1) | 10 |
| Comparative Example 5 | Charge transfer | RX50 | 40 | HMDS | 5 | Compound (1) | 10 |
| Comparative Example 6 | Charge transfer | R972 | 60 | DMDCS | 20 | Compound (1) | 10 |

| | Outermost surface layer | | | | Undercoating layer +: present −: absent |
|---|---|---|---|---|---|
| | $S_{AVE}/V$ | Maximum gap region | Mean size (μm$^2$) | Void ratio ε (%) | Surface roughness Rz (μm) | |
| Example 1 | 1.704 | 0.70 | 0.0025 | 0.98 | 0.28 | + |
| Example 2 | 1.426 | 0.75 | 0.0022 | 0.98 | 0.20 | + |
| Example 3 | 1.767 | 0.85 | 0.0053 | 0.98 | 0.54 | + |
| Example 4 | 0.972 | 0.98 | 0.0190 | 0.92 | 0.38 | + |
| Example 5 | 1.810 | 0.65 | 0.0048 | 0.98 | 0.68 | + |
| Example 6 | 1.043 | 0.99 | 0.0011 | 0.98 | 0.16 | + |
| Example 7 | 1.924 | 0.98 | 0.0052 | 0.98 | 1.10 | + |
| Example 8 | 1.658 | 0.90 | 0.0035 | 0.98 | 0.39 | + |
| Example 9 | 1.704 | 0.70 | 0.0025 | 0.98 | 0.33 | − |
| Example 10 | 1.301 | 0.99 | 0.0063 | — | 0.58 | + |
| Example 11 | 1.743 | 0.68 | 0.0031 | 0.98 | 0.34 | + |
| Example 12 | 1.744 | 0.72 | 0.0029 | 0.96 | 0.28 | + |
| Comparative Example 1 | 2.560 | 1.45 | 0.0090 | 0.98 | 2.40 | + |
| Comparative Example 2 | 1.665 | 1.02 | 0.0085 | 0.98 | 1.10 | + |
| Comparative Example 3 | 0.499 | 0.65 | 0.0016 | 0.98 | 0.18 | + |
| Comparative Example 4 | 1.090 | 2.10 | 27.9000 | 0.94 | 1.10 | + |
| Comparative Example 5 | 0.498 | 2.20 | 0.0015 | 0.92 | 0.29 | + |
| Comparative Example 6 | 2.680 | 0.45 | 0.0031 | 0.98 | 0.78 | + |

*Alumina microparticles

TABLE 2

| | Initial sensitivity | | Printing durability | | | | Cleanability | Overall |
|---|---|---|---|---|---|---|---|---|
| | | | Shaving amount | | Charge stability | | | |
| | Sensitivity (−V) | Grade | (μm/100K rotations) | Grade | $\Delta V_0$ (V) | Grade | Grade | grade |
| Example 1 | 69 | A | 0.42 | A | 53 | A | A | A |
| Example 2 | 72 | A | 0.42 | A | 53 | A | A | A |
| Example 3 | 70 | A | 0.45 | A | 53 | A | B | B |
| Example 4 | 71 | A | 0.48 | B | 58 | A | B | B |
| Example 5 | 73 | A | 0.33 | A | 54 | A | B | B |
| Example 6 | 71 | A | 0.72 | C | 52 | A | A | C |
| Example 7 | 103 | B | 0.48 | A | 79 | B | C | C |
| Example 8 | 76 | A | 0.49 | A | 78 | B | C | C |
| Example 9 | 65 | A | 0.45 | A | 98 | C | A | C |
| Example 10 | 130 | C | 0.21 | A | 79 | B | C | C |
| Example 11 | 68 | A | 0.37 | A | 75 | B | B | B |
| Example 12 | 70 | A | 0.42 | A | 53 | A | A | A |
| Comparative Example 1 | 82 | B | 0.49 | A | 53 | A | D | D |

TABLE 2-continued

| | Initial sensitivity | | Printing durability Shaving amount (μm/100K rotations) | | Charge stability | | Cleanability | Overall |
|---|---|---|---|---|---|---|---|---|
| | Sensitivity (−V) | Grade | | Grade | $\Delta V_0$ (V) | Grade | Grade | grade |
| Comparative Example 2 | 72 | A | 0.48 | A | 53 | A | D | D |
| Comparative Example 3 | 94 | B | 0.89 | D | 53 | A | C | D |
| Comparative Example 4 | 129 | C | 0.52 | B | 58 | A | D | D |
| Comparative Example 5 | 71 | A | 0.94 | D | 58 | A | B | D |
| Comparative Example 6 | 79 | A | 0.30 | A | 55 | A | D | D |

The results in Table 1 and Table 2 suggest the followings.

(1) When inorganic compound microparticles having a mean primary particle diameter of 10-40 nm is dispersed in a charge transport layer at 7-18% by mass to the total solid content (N), and a scanning transmission electron microscope image of a cross section of a photoconductive layer in a strip-shaped sample piece having a thickness of 70 nm from the photoconductive layer provides a mean occupied area of the inorganic compound microparticles in a 5 μm×5 μm predetermined region in the observation field of view as $S_{Ave}$, (%), photoconductors having a $S_{Ave}/N$ of 0.5 or more to 2.0 or less, and a maximum gap region of 1.0 μm or less by equivalent circle diameter (Examples 1-11) can achieve improvement of printing durability, and suppression of poor cleaning and unevenness in density on an image, compared to a photoconductor containing silica particles having $S_{Ave}/N$ out of the above-described range (Comparative Example 1), photoconductors having a maximum gap region by equivalent circle diameter out of the above-described range (Comparative Examples 1, 2, 4, 5), and photoconductors having a mean primary particle diameter out of the above-described range (Comparative Examples 3, 4), and compered to photoconductors having a content of inorganic compound microparticles to the total solid content out of the above-described range (Comparative Examples 3, 4). Control of a mean primary particle diameter of inorganic microparticles in a photoconductive layer within the above-described range leads to finer particles in the photoconductive layer, thus increases the number of particles and enhances interaction of Van der Waals' forces among silica microparticles, thereby forming a three-dimensional mesh structure where individual particles forms gentle interconnections. In a system without formation of a mesh structure, a photoconductive layer, silica microparticles, and the like are gradually peeled off to progress wear in a wearing process, but formation of a mesh structure makes interaction among microparticles work strongly, thus enabling suppressing release of a silica filler from a photoconductive layer. This improves printing durability of a photoconductive layer.

Photoconductors further including a surface protective layer on a charge transport layer (Examples 10, 11) can also obtain effects similar to those described above.

(2) Photoconductors having a mean size of inorganic microparticles of more than 0.005 μm² (Examples 3, 4, 7, and Comparative Examples 1, 2, 4) is revealed to tend to have deteriorated cleanability, and a mean size of 0.005 μm² or less is revealed to be better. Formation of the mesh structure in a photoconductive layer with a mean particle diameter in the prescribed range described above makes silica microparticles distributed uniformly on a photoconductive layer surface, thus reducing a load to a cleaning blade in wearing.

(3) A photoconductor employing a silica filler as inorganic microparticles (Example 11) is revealed to have an extremely better initial sensitivity property despite having lower printing durability, compared to a photoconductor employing an alumina filler as inorganic microparticles (Example 10). Silica has a lower dielectric constant relative to alumina and thus gives smaller damage to a sensitivity characteristic, and overall evaluation shows that employment of a silica filler as inorganic microparticles enabled providing better characteristics.

(4) Photoconductors in which avoid ratio of a silica filler itself in a photoconductive layer represented by the aforementioned formula is out of the range of 0.96-0.98 (Examples 1, 4, 12 and Comparative Example 4) are revealed to tend to have larger gap region with absence of a silica filler and to tend to have deteriorated cleanability, and a gap region in the range of 0.96-0.98 is revealed to be better. Employment of the above-described prescribed range of a silica filler that forms a mesh structure in a photoconductive layer is considered to make interaction among fillers work more effectively and results in improved printing durability of a photoconductor.

(5) Treatment of a silica filler in a photoconductive layer with dimethyldichlorosilane or hexamethyldisilazane provides better sensitivity of a photoconductor compared to untreated photoconductors (Example 7 and Comparative Example 4).

(6) Comparison of photoconductors for surface roughness of a photoconductor surface Rz (Examples 1, 5, 6, and Comparative Example 1) reveals that the photoconductor in Example 1, which has a surface roughness of a surface layer Rz of less than 0.2-1.0 μm, tends to have both good cleanability and printing durability. Lower Rz increases a contact area to a blade, makes friction larger, and tends to provide deteriorated printing durability, but in the photoconductive layer, interaction among minute silica microparticles works effectively in a prescribed range described above, thereby suppressing deterioration of printing durability. On the other hand, with a Rz of more than 1.0, cavities and projections on a surface are large, and furthermore, interaction among fillers is too strong, thus leading to extremely larger printing durability. A blade thus progresses in wear and chips by fatigue via repetition, thereby being likely to cause poor cleaning. Stable image characteristics cannot be obtained for a long term.

What is claimed is:

1. An electrophotographic photoconductor comprising:
    a photoconductive layer comprising at least a charge generation layer and a charge transport layer serially stacked, the photoconductive layer provided on an electrically-conductive base,
    wherein an outermost surface layer of the electrophotographic photoconductor comprises silica microparticles,
    wherein the silica microparticles have a number mean primary particle diameter of 10-40 nm, and are mixed and stirred in a glass container before being dispersed uniformly into the outermost surface layer at a proportion of 7-18% by mass in the outermost surface layer,
    wherein, in slicing the outermost surface layer in a stacking direction of the outermost surface layer with a thickness of 70 nm, a strip-shaped sample piece thus obtained is observed under a scanning transmission electron microscope, a cross-sectional image thus obtained is converted to an 8-bit binary image, any 50 regions from regions having a 5 μm×5 μm observation field of view in the 8-bit binary image thus obtained is observed, and a relationship represented by the following formula is met:

$$0.5 \leq S_{Ave}/N \leq 2.0$$

wherein $S_{Ave}$ is a mean value of the 50 regions for a proportion (%) of an occupied area of the silica microparticles to an area of an observation region (S) being 25 μm², and N is a total solid content (g) in the outermost surface layer,
    wherein a maximum gap region has a size of 1.0 μm or less when represents a space with absence of the silica microparticles converted to an equivalent circle diameter, and
    wherein the outermost surface layer has a surface with a surface roughness (Rz) of 0.2-1.0 μm defined in JIS-B-0601 (1994).

2. The electrophotographic photoconductor according to claim 1, wherein the silica microparticles have a mean size of 0.005 μm² or less in a 5 μm×5 μm observation field of view in the 8-bit binary image.

3. The electrophotographic photoconductor according to claim 1, wherein the silica microparticles have a void ratio (ε) of 0.96-0.98, the void ratio being represented by the formula:

$$\varepsilon = 1 - rB/rS$$

wherein rB is a bulk density of the silica microparticles (g/cm³), and rS is a true density of the silica microparticles (g/cm³).

4. The electrophotographic photoconductor according to claim 1, wherein the silica microparticles are surface-treated with dimethyldichlorosilane or hexamethyldisilazane.

5. The electrophotographic photoconductor according to claim 1, wherein the outermost surface layer is the charge transport layer configuring the photoconductive layer, or a surface protective layer formed on the photoconductive layer.

6. The electrophotographic photoconductor according to claim 1, further comprising an undercoating layer between the electrically-conductive base and the photoconductive layer.

7. An image-forming apparatus comprising, at least:
    the electrophotographic photoconductor according to claim 1;
    a charger to charge the electrophotographic photoconductor;
    an exposurer to expose the electrophotographic photoconductor thus charged and form an electrostatic latent image;
    a developer to develop the electrostatic latent image formed by the exposure and form a toner image;
    a transferer to transfer, on a recording medium, the toner image formed by the development;
    a fixture to fix, on the recording medium, the toner image thus transferred and form an image;
    a cleaner to remove and recover toner remaining on the electrophotographic photoconductor; and
    a static eliminator to eliminate surface charge remaining on the electrophotographic photoconductor.

8. The electrophotographic photoconductor according to claim 1,
    wherein the outermost surface layer of the electrophotographic photoconductor is the charge transport layer,
    wherein the electrophotographic photoconductor comprises an undercoating layer between the electrically-conductive base and the photoconductive layer,
    wherein the silica microparticles are dispersed uniformly into the outermost surface layer at a proportion of 7-12% by mass in the outermost surface layer, and
    wherein the maximum gap region has a size of 0.75 μm or less.

9. An electrophotographic photoconductor comprising:
    a photoconductive layer, comprising at least a charge generation layer and a charge transport layer serially stacked, the photoconductive layer provided on an electrically-conductive base,
    wherein an outermost surface layer of the electrophotographic photoconductor comprises silica microparticles,
    wherein the silica microparticles have a number mean primary particle diameter of 10-40 nm,
    wherein the silica microparticles are added to a glass container along with at least a charge transport substance, a binder resin, and a solvent, and are mixed and stirred in the glass container and then are dispersed uniformly into the outermost surface layer at a proportion of 7-18% by mass in the outermost surface layer,
    wherein, in slicing the outermost surface layer in a stacking direction of the outermost surface layer with a thickness of 70 nm, a strip-shaped sample piece thus obtained is observed under a scanning transmission electron microscope, a cross-sectional image thus obtained is converted to an 8-bit binary image, any 50 regions from regions having a 5 μm×5 μm observation field of view in the 8-bit binary image thus obtained is observed, and a relationship represented by the following formula is met:

$$0.5 \leq S_{Ave}/N \leq 2.0$$

wherein $S_{Ave}$ is a mean value of the 50 regions for a proportion (%) of an occupied area of the silica microparticles to an area of an observation region (S) being 25 μm², and N is a total solid content (g) in the outermost surface layer, and
    wherein a maximum gap region has a size of 1.0 μm or less when represents a space with absence of the silica microparticles converted to an equivalent circle diameter.

* * * * *